United States Patent
Wu et al.

(10) Patent No.: US 10,001,772 B2
(45) Date of Patent: Jun. 19, 2018

(54) OPTIMALLY SCHEDULING OF CLOSE-DOWN PROCESS FOR SINGLE-ARM CLUSTER TOOLS WITH WAFER RESIDENCY TIME CONSTRAINTS

(71) Applicant: Macau University of Science and Technology, Macau (MO)

(72) Inventors: Naiqi Wu, Macau (MO); Qinghua Zhu, Macau (MO); Mengchu Zhou, Macau (MO); Yan Qiao, Macau (MO)

(73) Assignee: Macau University of Science and Technology, Macau (MO)

( * ) Notice: Subject to any disclaimer, the term of this patent is extended or adjusted under 35 U.S.C. 154(b) by 338 days.

(21) Appl. No.: 14/918,564

(22) Filed: Oct. 21, 2015

(65) Prior Publication Data
US 2017/0083010 A1  Mar. 23, 2017

Related U.S. Application Data

(60) Provisional application No. 62/221,027, filed on Sep. 20, 2015.

(51) Int. Cl.
*G05B 19/418*  (2006.01)

(52) U.S. Cl.
CPC ............ *G05B 19/41865* (2013.01); *G05B 2219/34418* (2013.01); *G05B 2219/45031* (2013.01);
(Continued)

(58) Field of Classification Search
CPC ...... G05B 19/4187; G05B 2219/45031; G05B 2219/50291; Y02P 90/02
See application file for complete search history.

(56) References Cited

U.S. PATENT DOCUMENTS

| | | | |
|---|---|---|---|
| 5,855,681 A | * | 1/1999 | Maydan ............ H01L 21/67167 118/719 |
| 5,909,994 A | * | 6/1999 | Blum ................. H01L 21/67167 118/719 |

(Continued)

OTHER PUBLICATIONS

Aized, T., "Petri Net as a Manufacturing System Scheduling Tool, Advances in Petri Net Theory and Applications", 2010, ISBN: 978-953-307-108-4.*

(Continued)

*Primary Examiner* — Mohammad Ali
*Assistant Examiner* — Kelvin Booker
(74) *Attorney, Agent, or Firm* — Spruson & Ferguson (Hong Kong) Limited

(57) ABSTRACT

Recent trends of larger wafer and smaller lot sizes bring cluster tools with frequent lot switches. Practitioners must deal with more transient processes during such switches, including start-up and close-down processes. To obtain higher yield, it is necessary to shorten the duration of transient processes. Much prior effort was poured into the modeling and scheduling for the steady state of cluster tools. In the existing literature, no attention has been turned to optimize the close-down process for single-arm cluster tools with wafer residency constraints. This invention intends to do so by 1) developing a Petri net model to analyze their scheduling properties and 2) proposing Petri net-based methods to solve their close-down optimal scheduling problems under different workloads among their process steps. Industrial examples are used to illustrate the effectiveness and application of the proposed methods.

8 Claims, 5 Drawing Sheets

(52) U.S. Cl.
CPC ... *G05B 2219/50391* (2013.01); *Y10S 901/02* (2013.01); *Y10S 901/30* (2013.01)

(56) References Cited

U.S. PATENT DOCUMENTS

| | | | | |
|---|---|---|---|---|
| 5,928,389 | A * | 7/1999 | Jevtic | G05B 19/41865 29/25.01 |
| 6,082,950 | A * | 7/2000 | Altwood | H01L 21/67742 414/217 |
| 6,152,070 | A * | 11/2000 | Fairbairn | H01L 21/67201 118/719 |
| 6,224,312 | B1 * | 5/2001 | Sundar | H01L 21/67167 414/217 |
| 6,418,350 | B1 * | 7/2002 | Hamidzadeh | G05B 19/41865 700/100 |
| 9,223,307 | B1 * | 12/2015 | Wu | B25J 9/009 |
| 9,227,318 | B1 * | 1/2016 | Bai | B25J 9/009 |
| 9,333,645 | B1 * | 5/2016 | Wu | B25J 9/0087 |
| 9,862,554 | B2 * | 1/2018 | Caveney | B65G 47/901 |
| 9,884,726 | B2 * | 2/2018 | van der Meulen | B65G 25/02 |
| 2003/0213560 | A1 * | 11/2003 | Wang | C23C 14/566 156/345.31 |
| 2004/0176868 | A1 * | 9/2004 | Haga | G05B 19/418 700/121 |
| 2005/0102723 | A1 * | 5/2005 | Van Den Nieuwelaar | G03F 7/70525 718/1 |
| 2006/0285945 | A1 * | 12/2006 | Hofmeister | H01L 21/67161 414/217 |
| 2007/0090953 | A1 * | 4/2007 | Park | G05B 19/4183 340/572.1 |
| 2007/0269297 | A1 * | 11/2007 | Meulen | B65G 25/02 414/222.01 |
| 2007/0282480 | A1 * | 12/2007 | Pannese | G05B 15/02 700/213 |
| 2008/0163096 | A1 * | 7/2008 | Pannese | G05B 19/4069 715/772 |
| 2014/0271083 | A1 * | 9/2014 | Caveney | H01L 21/67173 414/749.5 |
| 2015/0202774 | A1 * | 7/2015 | Blank | H01L 21/68 700/254 |
| 2017/0080563 | A1 * | 3/2017 | Wu | G05B 19/41865 |
| 2017/0115651 | A1 * | 4/2017 | Wu | G05B 19/0426 |

OTHER PUBLICATIONS

Jung, C.; Kim, H.-J. and Lee, T.-E., "A Branch and Bound Algorithm for Cyclic Scheduling of Timed Petri Nets", Jan. 2015, IEEE Transactions on Automation Science and Engineering, vol. 12, No. 1.*

Kim, H.-J.; Lee, J.-H. and Lee, T.-E., "Noncyclic Scheduling of Cluster Tools with a Branch and Bound Algorithm", Apr. 2015, IEEE Transactions on Automation Science and Engineering, vol. 12, No. 2.*

Kim, W.-S. and Morrison, J.R., "On Equilibrium Probabilities for the Delays in Deterministic Flow Lines with Random Arrivals", Jan. 2015, IEEE Transactions on Automation Science and Engineering, vol. 12, No. 1.*

Lee, Y.-H.; Chang, C.-T.; Wong, D.S.-H. and Jang, S.-S., "Petri-Net Based Scheduling Strategy for Semiconductor Manufacturing Processes", 2011, Chemical Engineering Research and Design, 89, 291-300.*

Li L., Sun, Z., Zhou, M.C. and Qiao, F., "Adaptive Dispatching Rule for Semiconductor Wafer Fabrication Facility", Apr. 2013, IEEE Transactions on Automation Science and Engineering, vol. 10, No. 2.*

Lin, S.-Y.; Fu, L.-C.; Chiang, T.-C. and Shen, Y.-S., "Colored Timed Petri-Net and GA Based Approach to Modeling and Scheduling for Wafer Probe Center", Sep. 2003, Proceedings of the 2003 IEEE Intl. Conf. on Robotics and Automation.*

Qiao, Y.; Wu, N.Q. and Zhou, M.C., "A Petri Net-Based Novel Scheduling Approach and Its Cycle Time Analysis for Dual-Arm Cluster Tools with Wafer Revisiting", Feb. 2013, IEEE Transactions on Semiconductor Manufacturing, vol. 26, No. 1.*

Qiao, Y.; Wu, N. and Zhou, M., "Petri Net Modeling and Wafer Sojourn Time Analysis of Single-Arm Cluster Tools with Residency Time Constraint and Activity Time Variation", 2011.*

Qiao, Y.; Wu, N. and Zhou, M., "Real-Time Scheduling of Single-Arm Cluster Tools Subject to Residency Time Constraints and Bounded Activity Time Variation", Jul. 2012, IEEE Transactions on Automation Science and Engineering, vol. 9, No. 3.*

Qiao, Y.; Wu, N. and Zhou, M., "Scheduling of Dual-Arm Cluster Tools with Wafer Revisiting and Residency Time Contraints", Feb. 2014, IEEE Transactions on Industrial Informatics, vol. 10, No. 1.*

Qiao, Y.; Pan, C.-R.; Wu, N.-Q. and Zhou, M., "Response Policies to Process Module Failure in Single-Arm Cluster Tools Subject to Wafer Residency Time Constraints", Jul. 2015, IEEE Transactions on Automation Schence and Engineering, vol. 12, No. 3.*

Yang, F.; Qu, N.; Qiao, Y. and Zhou, M., "Optimal One-Wafer Cyclic Scheduling Analysis of Hybrid Multi-Cluster Tools with ONe-Space Buffering Module", May 31-Jun. 7, 2014, 2014 IEEE Intl Conf. on Robotics and Automation.*

Yang, F.; Wu, N.; Qiao, Y. and Zhou, M., "Petri Net-Based Optimal One-Wafer Cyclic Scheduling of Hybrid Multi-Cluster Tools in Wafer Fabrication", May 2014, IEEE Transactions on Semiconductor Manufacturing, vol. 27, No. 2.*

Yang, F.; Wu, N.; Qiao, Y. and Zhou, M., "Petri Net-Based Polynomially Complex Approach to Optimal One-Wafer Cyclic Scheduling of Hybrid Multi-Cluster Tools in Semiconductor Manufacturing", Dec. 2014, IEEE Transactions on Systems, Man and Cybernetics, vol. 44, No. 12.*

Zhu, Q.; Wu, N.; Qiao, Y. and Zhou, M., "Petri Net Modeling and One-Wafer Scheduling of Single-Arm Multi-Cluster Tools", 2013, 2013 IEEE Intl Conf on Automation Science.*

Zhu, Q. and Qiao, Y., "Scheduling Single-Arm Multi-Cluster Tools with Lower Bound Cycle Time via Petri Nets", Dec. 2012, Intl Journal of Intelligent Control and Systems, vol. 17, No. 4.*

Zhu, Q.; Qiao, Y. and Zhou, M., "Petri Net Modeling and One-Wafer Scheduling of Single-Arm Tree-Like Multi-Cluster Tools", Aug. 2015, 2015 IEEE Intl Conf on Automation Science and Engineering.*

Zhu, Q.; Wu, N.; Qiao, Y. and Zhou, M., "Modeling and Schedulability Analysis of Single-Arm Multi-Cluster Tools with Residency Time Contraints via Petri Nets", Aug. 2014, 2014 IEEE Intl Conf on Automation Science and Engineering.*

Attia, R; Amari, S. and Martinez, C., "Control of Time-Contrained Dual-Armed Cluster Tools Using (max, +) Algebra", Oct. 2010, Conference on Control and Fault-Tolerant Systems (SysTol'10).*

Cury, J.; Martinez, C. and de Queiroz, M.H., "Scheduling Cluster Tools with Supervisory Control Theory", May 2013, 11th IFAC Workshop on Intelligent Manufacturing Systems.*

Jin, H.-Y. and Morrison, J.R., "Transient Scheduling of Single Armed Cluster Tools: Algorithms for Wafer Residency Constraints", 2013, IEEE International Conference on Automation Science and Engineering.*

Pan, C.; Qiao, Y.; Wu, N. and Zhou, M., "A Novel Algorithm for Wafer Sojourn Time Analysis of Single-Arm Cluster Tools with Wafer Residency Time Constraints and Activity Time Variation", May 2015, IEEE Transactions on Systems, Man and Cybernetics: Systems, vol. 45, No. 5.*

Lee, T.-E., "A Review of Scheduling Theory and Methods for Semiconductor Manufacturing Cluster Tools", 2008, Proceedings of the 2008 Winter Simulation Conference.*

A. Caloini, G. A. Magnani, M. Pezzè, "A technique for designing robotic control systems based on Petri nets," IEEE Transactions on Control Systems and Technology, vol. 6, No. 1, pp. 72-87, 1998.

W. K. V. Chan, J. Yi, and S. Ding, "Optimal scheduling of multicluster tools with constant robot moving times, part I: two-cluster analysis," IEEE Transactions on Automation Science and Engineering, vol. 8 No. 1, pp. 5-16, Jan. 2011.

(56) References Cited

OTHER PUBLICATIONS

S. Ding, J. Yi, and M. Zhang, "Scheduling multi-cluster tools: An integrated event graph and network model approach," IEEE Transactions on Semiconductor Manufacturing, vol. 19, No. 3, pp. 339-351, Aug. 2006.
L. Ferrarini and L. Piroddi, "Modeling and control of fluid transportation operations in production plants with Petri nets," IEEE Transactions on Control Systems and Technology, vol. 16, No. 5, pp. 1090-1098, 2008.
D. Liu, Z. W. Li, and M. C. Zhou, "Hybrid Liveness-Enforcing Policy for Generalized Petri Net Models of Flexible Manufacturing Systems," IEEE Transactions on Systems, Man, and Cybernetics: Systems, 43(1), pp. 85-97, Jan. 2013.
C. Jung and T.-E. Lee, "An efficient mixed integer programming model based on timed Petri nets for diverse complex cluster tool scheduling problems," IEEE Transactions on Semiconductor Manufacturing, vol. 25, No. 2, pp. 186-199, 2012.
T. K. Kim, C. Jung and T. E. Lee, "Scheduling start-up and close-down periods of dual-armed cluster tools with wafer delay regulation" International Journal of Production Research, vol. 50, No. 10, pp. 2785-2795, May 2012.
D. K. Kim, T. E. Lee, and H. J. Kim, "Optimal scheduling of transient cycles for single-armed cluster tools," in Proceedings of the 2013 IEEE International Conference on Automation Science and Engineering, Madison, WI, USA, Aug. 2013a.
H. J. Kim, J. H. Lee, C. Jung, and T. E. Lee, "Scheduling cluster tools with ready time constraints for consecutive small lots," IEEE Transactions on Automation Science and Engineering, vol. 10, No. 1, pp. 145-159, Jan. 2013b.
H. J. Kim, J. H. Lee, and T. E. Lee, "Noncyclic scheduling of cluster tools with a branch and bound algorithm," IEEE Transactions on Automation Science and Engineering, DOI: 10.1109/TASE.2013.2293552, 2013c.
J.-H.Kim, T.-E. Lee, H.-Y. Lee, and D.-B. Park, "Scheduling analysis of timed-constrained dual-armed cluster tools," IEEE Transactions on Semiconductor Manufacturing, vol. 16, No. 3, 521-534, 2003.
J.-H. Kim, T.-E. Lee, H.-Y. Lee, and D.-B. Park, "Scheduling analysis of timed-constrained dual-armed cluster tools," IEEE Transactions on Semiconductor Manufacturing, vol. 16, No. 3, 521-534, 2003.
J. H. Lee, H. J. Kim, and T. E. Lee, "Scheduling lot switching operations for cluster tools," IEEE Transactions on Semiconductor Manufacturing, vol. 26, No. 4, pp. 592-601, 2013.
J. H. Lee, H. J. Kim, and T. E. Lee, "Scheduling cluster tools for concurrent processing of two wafer types." IEEE Transactions on Automation Science Engineering, vol. 11, No. 2, pp. 525-536, 2014.
T.-E. Lee, H.-Y Lee, and Y.-H. Shin, "Workload balancing and scheduling of a single-armed cluster tool," in Proceedings of the 5th APIEMS Conference, Gold Coast, Australia, 1-15, 2004.
T.-E. Lee and S.-H. Park, "An extended event graph with negative places and tokens for timed window constraints," IEEE Transactions on Automation Science and Engineering, vol. 2, No. 4, 319-332, 2005.
D-Y. Liao, M. D. Jeng, and M. C. Zhou, "Petri net modeling and Lagrangian relaxation approach to vehicle scheduling in 300 mm semiconductor manufacturing," in Proc. 2004 IEEE International Conference on Robotics and Automation, New Orleans, LA, 2004, pp. 5301-5306.
M.-J. Lopez and S.-C. Wood, "Systems of multiple cluster tools—configuration, reliability, and performance," IEEE Transactions on Semiconductor Manufacturing, vol. 16, No. 2, 170-178, 2003.
T. L. Perkinson, P. K. Maclarty, R. S. Gyurcsik, and R. K. Cavin, III, "Single-wafer cluster tools performance: An analysis of throughput," IEEE Transactions on Semiconductor Manufacturing, vol. 7, No. 2, pp. 369-373, May 1994.
T. L. Perkinston, R. S. Gyurcsik, and P. K. Maclarty, "Single-wafer cluster tool performance: An analysis of effects of redundant chambers and revisitation sequences on throughput," IEEE Transactions on Semiconductor Manufacturing, vol. 9, No. 2, pp. 384-400. May 1996.
Y. Qiao, N. Q. Wu, and M. C. Zhou, "Petri net modeling and wafer sojourn time analysis of single-arm cluster tools with residency time constraints and activity time variation," IEEE Transactions on Semiconductor manufacturing, vol. 25, No. 3, 432-446, 2012a.
Y. Qiao, N. Q. Wu, and M. C. Zhou, "Real-time scheduling of single-arm cluster tools subject to residency time constraints and bounded activity time variation," IEEE Transactions on Automation Science and Engineering, vo. 9, No. 3, 564-577, 2012b.
Y. Qiao, N. Q. Wu, and M. C. Zhou, "A Petri net-based novel scheduling approach and its cycle time analysis for dual-arm cluster tools with wafer revisiting," IEEE Transactions on Semiconductor Manufacturing, vol. 26, No. 1, pp. 100-110, Feb. 2013.
S. Rostami, B. Hamidzadeh, and D. Camporese, "An optimal periodic scheduler for dual-arm robots in cluster tools with residency constraints," IEEE Transactions on Robotics and Automation, vol. 17, 609-618, 2001.
S. Venkatesh, R. Davenport, P. Foxhoven, and J. Nulman, "A steady state throughput analysis of cluster tools: Dual-blade versus single-blade robots," IEEE Transactions on Semiconductor Manufacturing, vol. 10, No. 4, pp. 418-424, Nov. 1997.
N. Q. Wu, C. B. Chu, F. Chu, and M. C. Zhou, "A Petri net method for schedulability and scheduling problems in single-arm cluster tools with wafer residency time constraints," IEEE Transactions on Semiconductor Manufacturing, vol. 21, No. 2, 224-237, 2008.
N. Q. Wu, and M. C. Zhou, "Avoiding deadlock and reducing starvation and blocking in automated manufacturing systems", IEEE Transactions on Robotics and Automation, vol. 17, No. 5, pp. 657-668, 2001.
N. Q. Wu and M. C. Zhou, "Modeling and deadlock control of automated guided vehicle systems," IEEE/ASME Transactions on Mechatronics, vol. 9, No. 1, pp. 50-57, 2004.
N. Q. Wu and M. C. Zhou, System modeling and control with resource-oriented Petri nets, CRC Press, Taylor & Francis Group, New York, Oct. 2009.
N. Q. Wu and M. C. Zhou, "Colored time Petri nets for modeling and analysis of cluster tools," Asian Journal of Control, vol. 12, No. 3, pp. 253-266, 2010a.
N. Q. Wu and M. C. Zhou, "A closed-form solution for schedulability and optimal scheduling of dual-arm cluster tools with wafer residency time constraint based on steady schedule analysis," IEEE Transactions on Automation Science and Engineering, vol. 7, No. 2, 303-315, 2010b.
J. Wikborg and T. E. Lee, "Noncyclic scheduling for timed discrete event systems with application to single-armed cluster tools using Pareto-optimal optimization," IEEE Transactions on Automation Science and Engineering, vol. 10, No. 3, pp. 689-710, Jul. 2011.
J. Yi, S. Ding, and M. Zhang, "Steady-state throughput and scheduling analysis of multi-cluster tools: A decomposition approach," IEEE Transactions on Automation Science and Engineering, vol. 5, No. 2, pp. 321-336, Apr. 2008.
H. J. Yoon and D. Y. Lee, "On-line scheduling of integrated single-wafer processing tools with temporal constraints," IEEE Transactions on Semiconductor Manufacturing, vol. 18, No. 3, 390-398, 2005.
M. Zhou and F. DiCesare, "Parallel and sequential mutual exclusions for Petri net modeling of manufacturing systems with shared resources," IEEE Transactions on Robotics and Automation, vol. 7, No. 4, pp. 515-527, 1991.
M. Zhou, F. DiCesare, and A. Desrochers, "A hybrid methodology for synthesis of Petri nets for manufacturing systems", IEEE Transactions on Robotics and Automation, vol. 8, pp. 350-361, 1992.
M. C. Zhou and M. D. Jeng, "Modeling, analysis, simulation, scheduling, and control of semiconductor manufacturing systems: a Petri net approach," IEEE Transactions on Semiconductor Manufacturing, vol. 11, No. 3, pp. 333-357, 1998.
M. C. Zhou, C.-H. Wang, and X. Y. Zhao, "Automating mason's rule and its application to analysis of stochastic Petri nets," IEEE Transactions on Control Systems and Technology, vol. 3, No. 2, pp. 238-244, 1995.

(56) References Cited

OTHER PUBLICATIONS

Q. H. Zhu, N. Q. Wu, Y. Qiao, and M. C. Zhou, "Petri Net-Based Optimal One-Wafer Scheduling of Single-Arm Multi-Cluster Tools in Semiconductor Manufacturing," IEEE Transactions on Semiconductor Manufacturing, vol. 26, No. 4, pp. 578-591, 2013a.

Q. H. Zhu, N. Q. Wu, Y. Qiao, and M. C. Zhou, "Scheduling of Single-Arm Multi-Cluster Tools to Achieve the Minimum Cycle Time," in Proc. IEEE International Conference on Robotics and Automation, pp. 3555-3560, Karlsruhe, Germany, May 2013b.

Q. H. Zhu, N. Q. Wu, Y. Qiao, and M. C. Zhou, "Modeling and Schedulability Analysis of Single-Arm Multi-Cluster Tools with Residency Time Constraints via Petri Nets" in Proc. IEEE International Conference on Automation Science and Engineering, Taipei, Taiwan, pp. 81-86, 2014.

Q. H. Zhu, N. Q. Wu, Y. Qiao, and M. C. Zhou, "Scheduling of Single-Arm Multi-cluster Tools With Wafer Residency Time Constraints in Semiconductor Manufacturing" IEEE Transactions on Semiconductor Manufacturing, DOI10.1109/TSM.2014.2375880, vol. 28, No. 1, 2015.

W. M. Zuberek, "Timed Petri nets in modeling and analysis of cluster tools," IEEE Transactions on Robotics and Automation, vol. 17, No. 5, pp. 562-575, Oct. 2001.

\* cited by examiner

OPTIMALLY SCHEDULING OF CLOSE-DOWN PROCESS FOR SINGLE-ARM CLUSTER TOOLS WITH WAFER RESIDENCY TIME CONSTRAINTS

CROSS-REFERENCE TO RELATED APPLICATIONS

This application claims the benefit of U.S. Provisional Patent Application No. 62/221,027, filed on Sep. 20, 2015, which is incorporated by reference herein in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appear in the Patent and Trademark Office patent file or records, but otherwise reserves all copyrights whatsoever.

FIELD OF THE INVENTION

The present invention relates to a method for scheduling a process for single-arm cluster tools. More particularly, the present invention relates to a method for scheduling close-down process for single-arm cluster tools with wafer residency time constraints.

BACKGROUND

The following references are cited in the specification. Disclosures of these references are incorporated herein by reference in their entirety.

LIST OF REFERENCES

A. Caloini, G. A. Magnani, M. Pezze, "A technique for designing robotic control systems based on Petri nets," *IEEE Transactions on Control Systems and Technology*, vol. 6, no. 1, pp. 72-87, 1998.

W. K. V. Chan, J. Yi, and S. Ding, "Optimal scheduling of multicluster tools with constant robot moving times, part I: two-cluster analysis," *IEEE Transactions on Automation Science and Engineering*, vol. 8 no. 1, pp. 5-16, January 2011.

S. Ding, J. Yi, and M. Zhang, "Scheduling multi-cluster tools: An integrated event graph and network model approach," *IEEE Transactions on Semiconductor Manufacturing*, vol. 19, no. 3, pp. 339-351, August 2006.

L. Ferrarini and L. Piroddi, "Modeling and control of fluid transportation operations in production plants with Petri nets," *IEEE Transactions on Control Systems and Technology*, vol. 16, no. 5, pp. 1090-1098, 2008.

D. Liu, Z. W. Li, and M. C. Zhou, "Hybrid Liveness-Enforcing Policy for Generalized Petri Net Models of Flexible Manufacturing Systems," *IEEE Transactions on Systems, Man, and Cybernetics: Systems,* 43(1), pp. 85-97, January 2013.

C. Jung and T.-E. Lee, "An efficient mixed integer programming model based on timed Petri nets for diverse complex cluster tool scheduling problems," *IEEE Transactions on Semiconductor Manufacturing*, vol. 25, no. 2, pp. 186-199, 2012.

T. K. Kim, C. Jung and T. E. Lee, "Scheduling start-up and close-down periods of dual-armed cluster tools with wafer delay regulation" *International Journal of Production Research*, vol. 50, no. 10, pp. 2785-2795, May 2012.

D. K. Kim, T. E. Lee, and H. J. Kim, "Optimal scheduling of transient cycles for single-armed cluster tools," in Proceedings of the 2013 *IEEE International Conference on Automation Science and Engineering*, Madison, Wis., USA, August 2013a.

H. J. Kim, J. H. Lee, C. Jung, and T. E. Lee, "Scheduling cluster tools with ready time constraints for consecutive small lots," *IEEE Transactions on Automation Science and Engineering*, vol. 10, no. 1, pp. 145-159, January 2013b.

H. J. Kim, J. H. Lee, and T. E. Lee, "Noncyclic scheduling of cluster tools with a branch and bound algorithm," *IEEE Transactions on Automation Science and Engineering*, DOI: 10.1109/TASE.2013.2293552, 2013c.

J.-H. Kim, T.-E. Lee, H.-Y. Lee, and D.-B. Park, "Scheduling analysis of timed-constrained dual-armed cluster tools," *IEEE Transactions on Semiconductor Manufacturing*, vol. 16, no. 3, 521-534, 2003.

J. H. Lee, H. J. Kim, and T. E. Lee, "Scheduling transient periods of dual-armed cluster tools," in Proceedings of the 2012 *IEEE International Conference on Mechatronics and Automation*, Chengdu, China, pp. 1569-1574, August 2012.

J. H. Lee, H. J. Kim, and T. E. Lee, "Scheduling lot switching operations for cluster tools," *IEEE Transactions on Semiconductor Manufacturing*, vol. 26, no. 4, pp. 592-601, 2013.

J. H. Lee, H. J. Kim, and T. E. Lee, "Scheduling cluster tools for concurrent processing of two wafer types." *IEEE Transactions on Automation Science Engineering*, vol. 11, no. 2, pp. 525-536, 2014.

T.-E. Lee, H.-Y. Lee, and Y.-H. Shin, "Workload balancing and scheduling of a single-armed cluster tool," in Proceedings of the 5th APIEMS Conference, Gold Coast, Australia, 1-15, 2004.

T.-E. Lee and S.-H. Park, "An extended event graph with negative places and tokens for timed window constraints," *IEEE Transactions on Automation Science and Engineering*, vol. 2, no. 4, 319-332, 2005.

D-Y. Liao, M. D. Jeng, and M. C. Zhou, "Petri net modeling and Lagrangian relaxation approach to vehicle scheduling in 300 mm semiconductor manufacturing," in *Proc. 2004 IEEE International Conference on Robotics and Automation*, New Orleans, La., 2004, pp. 5301-5306.

M.-J. Lopez and S.-C. Wood, "Systems of multiple cluster tools—configuration, reliability, and performance," *IEEE Transactions on Semiconductor Manufacturing*, vol. 16, no. 2, 170-178, 2003.

T. L. Perkinson, P. K. Maclarty, R. S. Gyurcsik, and R. K. Cavin, III, "Single-wafer cluster tools performance: An analysis of throughput," *IEEE Transactions on Semiconductor Manufacturing*, vol. 7, no. 2, pp. 369-373, May 1994.

T. L. Perkinston, R. S. Gyurcsik, and P. K. Maclarty, "Single-wafer cluster tool performance: An analysis of effects of redundant chambers and revisitation sequences on throughput," *IEEE Transactions on Semiconductor Manufacturing*, vol. 9, no. 2, pp. 384-400. May 1996.

Y. Qiao, N. Q. Wu, and M. C. Zhou, "Petri net modeling and wafer sojourn time analysis of single-arm cluster tools with residency time constraints and activity time variation," *IEEE Transactions on Semiconductor manufacturing*, vol. 25, no. 3, 432-446, 2012a.

Y. Qiao, N. Q. Wu, and M. C. Zhou, "Real-time scheduling of single-arm cluster tools subject to residency time constraints and bounded activity time variation," *IEEE Transactions on Automation Science and Engineering*, vo. 9, no. 3, 564-577, 2012b.

Y. Qiao, N. Q. Wu, and M. C. Zhou, "A Petri net-based novel scheduling approach and its cycle time analysis for dual-arm cluster tools with wafer revisiting," *IEEE Transactions on Semiconductor Manufacturing*, vol. 26, no. 1, pp. 100-110, February 2013.

Y. Qiao, N. Q. Wu, M. C. Zhou, and Q. H. Zhu, "Scheduling and Control of Start-up Process for Single-arm Cluster Tools with Residency Time Constraints," working paper, 2014

S. Rostami, B. Hamidzadeh, and D. Camporese, "An optimal periodic scheduler for dual-arm robots in cluster tools with residency constraints," *IEEE Transactions on Robotics and Automation*, vol. 17, 609-618, 2001.

S. Venkatesh, R. Davenport, P. Foxhoven, and J. Nulman, "A steady state throughput analysis of cluster tools: Dual-blade versus single-blade robots," *IEEE Transactions on Semiconductor Manufacturing*, vol. 10, no. 4, pp. 418-424, November 1997.

N. Q. Wu, C. B. Chu, F. Chu, and M. C. Zhou, "A Petri net method for schedulability and scheduling problems in single-arm cluster tools with wafer residency time constraints," *IEEE Transactions on Semiconductor Manufacturing*, vol. 21, no. 2, 224-237, 2008.

N. Q. Wu, and M. C. Zhou, "Avoiding deadlock and reducing starvation and blocking in automated manufacturing systems", *IEEE Transactions on Robotics and Automation*, vol. 17, no. 5, pp. 657-668, 2001.

N. Q. Wu and M. C. Zhou, "Modeling and deadlock control of automated guided vehicle systems," *IEEE/ASME Transactions on Mechatronics*, vol. 9, no. 1, pp. 50-57, 2004.

N. Q. Wu and M. C. Zhou, *System modeling and control with resource-oriented Petri nets*, CRC Press, Taylor & Francis Group, New York, October 2009.

N. Q. Wu and M. C. Zhou, "Colored time Petri nets for modeling and analysis of cluster tools," *Asian Journal of Control*, vol. 12, no. 3, pp. 253-266, 2010a.

N. Q. Wu and M. C. Zhou, "A closed-form solution for schedulability and optimal scheduling of dual-arm cluster tools with wafer residency time constraint based on steady schedule analysis," *IEEE Transactions on Automation Science and Engineering*, vol. 7, no. 2, 303-315, 2010b.

U. Wikborg and T. E. Lee, "Noncyclic scheduling for timed discrete event systems with application to single-armed cluster tools using Pareto-optimal optimization," *IEEE Transactions on Automation Science and Engineering*, vol. 10, no. 3, 689-710, July 2013.

J. Yi, S. Ding, and M. Zhang, "Steady-state throughput and scheduling analysis of multi-cluster tools: A decomposition approach," *IEEE Transactions on Automation Science and Engineering*, vol. 5, no. 2, pp. 321-336, April 2008.

H. J. Yoon and D. Y. Lee, "On-line scheduling of integrated single-wafer processing tools with temporal constraints," *IEEE Transactions on Semiconductor Manufacturing*, vol. 18, no. 3, 390-398, 2005.

M. Zhou and F. DiCesare, "Parallel and sequential mutual exclusions for Petri net modeling of manufacturing systems with shared resources," *IEEE Transactions on Robotics and Automation*, vol. 7, no. 4, pp. 515-527, 1991.

M. Zhou, F. DiCesare, and A. Desrochers, "A hybrid methodology for synthesis of Petri nets for manufacturing systems," *IEEE Transactions on Robotics and Automation*, vol. 8, pp. 350-361, 1992.

M. C. Zhou and M. D. Jeng, "Modeling, analysis, simulation, scheduling, and control of semiconductor manufacturing systems: a Petri net approach," *IEEE Transactions on Semiconductor Manufacturing*, vol. 11, no. 3, pp. 333-357, 1998.

M. C. Zhou and K. Venkatesh, *Modeling, simulation and control of flexible manufacturing systems: A Petri net approach*, World Scientific, Singapore, 1998.

M. C. Zhou, C.-H. Wang, and X. Y. Zhao, "Automating mason's rule and its application to analysis of stochastic Petri nets," *IEEE Transactions on Control Systems and Technology*, vol. 3, no. 2, pp. 238-244, 1995.

Q. H. Zhu, N. Q. Wu, Y. Qiao, and M. C. Zhou, "Petri Net-Based Optimal One-Wafer Scheduling of Single-Arm Multi-Cluster Tools in Semiconductor Manufacturing," *IEEE Transactions on Semiconductor Manufacturing*, vol. 26, no. 4, pp. 578-591, 2013a.

Q. H. Zhu, N. Q. Wu, Y. Qiao, and M. C. Zhou, "Scheduling of Single-Arm Multi-Cluster Tools to Achieve the Minimum Cycle Time," in *Proc. IEEE International Conference on Robotics and Automation*, pp. 3555-3560, Karlsruhe, Germany, May, 2013b.

Q. H. Zhu, N. Q. Wu, Y. Qiao, and M. C. Zhou, "Modeling and Schedulability Analysis of Single-Arm Multi-Cluster Tools with Residency Time Constraints via Petri Nets" in *Proc. IEEE International Conference on Automation Science and Engineering*, Taipei, Taiwan, pp 81-86, 2014.

Q. H. Zhu, N. Q. Wu, Y. Qiao, and M. C. Zhou, "Scheduling of Single-Arm Multi-cluster Tools With Wafer Residency Time Constraints in Semiconductor Manufacturing" *IEEE Transactions on Semiconductor Manufacturing*, DOI10.1109/TSM.2014.2375880, vol. 28, no. 1, 2015

W. M. Zuberek, "Timed Petri nets in modeling and analysis of cluster tools," *IEEE Transactions on Robotics and Automation*, vol. 17, no. 5, pp. 562-575, October 2001.

Cluster tools are widely used as wafer fabrication equipment by semiconductor manufacturers. Each consists of multiple processing modules (PMs), one wafer delivering robot, an aligner and two cassette loadlocks (LLs) for loading/unloading wafers. As shown in FIG. 1, the robot can be equipped with one or two blades, called single-arm or dual-arm, respectively; the former can carry one wafer while the latter can carry two wafers at a time. Two loadlocks working alternatively can keep the tool operating consecutively. According to a specified recipe, wafers are processed one by one at PMs in a cluster tool, each time there is one wafer processed at a PM.

Substantial efforts have been made for a cluster tool's modeling and performance analysis [Chan et al., 2011; Ding et al., 2006; Perkinston et al., 1994; Perkinston et al., 1996; Venkatesh et al., 1997; Wu and Zhou, 2010a; Yi et al., 2008; Zuberek, 2001; and Lee et al., 2014]. These studies show that in the steady state a cluster tool operates in one of two regions: process or transport-bound ones. The robot is always busy in the former and its task time dominates the cycle time of the tool. It has idle time in the latter and the processing time at PMs determines the cycle time. Since the robot moving time from one PM to another is much shorter than the wafer processing time, a backward scheduling strategy is optimal for single-arm cluster tools [Lee et al., 2004; and Lopez and Wood, 2003].

All aforementioned studies are conducted with the assumption that a wafer can stay in a PM for unlimited time after it is processed. However, strict residency constraints should be considered for some wafer fabrication processes, such as low-pressure chemical vapor deposition and rapid thermal processing. For them, a wafer's surface would be detrimental if it stays in a PM for too long time after being processed [Kim et al., 2003; Lee and Park, 2005; Rostami et al., 2001; and Yoon and Lee, 2005]. With such constraints, it is much more complicated to schedule a cluster tool. In order to solve it, the studies [Kim et al., 2003; Lee and Park, 2005; and Rostami et al., 2001] are conducted to find an optimal periodic schedule for dual-arm cluster tools with wafer residency time constraints. This problem is further investigated in [Wu et al., 2008; Wu and Zhou, 2010; and Qiao et al., 2012] for both single and dual-arm cluster tools by using Petri nets. Schedulability conditions are proposed to check if a cluster tool is schedulable. If so, closed-form algorithms are given to find the optimal cyclic schedule.

Majority of the existing studies [Chan et al., 2011; Ding et al., 2006; Perkinson et al., 1994; Perkinson et al., 1996; Venkatesh et al., 1997; Wu and Zhou, 2010a; Yi et al., 2008; Zuberek, 2001; Qiao et al., 2012a and 2012b; Qiao et al., 2013; Zhu et al., 2013a, 2013b, 2014, and 2015; and Lee et al., 2014] focus on finding an optimal periodical schedule for the steady state. However, a cluster tool should experience a start-up process before it reaches a steady state. Then, after the steady state, it will go through a close-down process. Very few studies are done for scheduling the transient process including the start-up and close-down process [Lee et al., 2012 and 2013; Kim et al., 2012, 2013a, 2013b, and 2013c; and Wikborg and Lee, 2013]. In semi-conductor manufacturing, recent trends are product customization and small lot sizes. Thus, the transient processes are more common due to product changeover and setups. Therefore, it becomes more important to optimize such transient processes. For a dual-arm cluster tool, Kim et al. [2012] propose methods to minimize the transient period based on a given robot task sequence. For a single-arm cluster tool, non-cyclic scheduling methods are developed in [Kim et al., 2013a, and Wikborg and Lee, 2013]. Due to small batch production, a cluster tool needs to switch from processing one lot to another different one frequently. Thus, techniques are developed to schedule lot switching processes for both single and dual-arm cluster tools in [Lee et al., 2012 and 2013; and Kim et al., 2013b and 2013c].

However, the above work on the transient process scheduling does not consider the wafer residency time constraints. Thus, their method in [Lee et al., 2012 and 2013; Kim et al., 2013a, 2013b, and 2013c; and Wikborg and Lee, 2013] cannot be applied to schedule a cluster tool with such constraints. It is these constraints that make an optimal schedule for a transient process without considering residency time constraints infeasible. Considering such constraints, Kim et al. [2012] develop scheduling methods to optimize the start-up and close-down processes for dual-arm cluster tools. Owing to a different scheduling strategy used to schedule a dual-arm cluster tool with residency constraints, the scheduling methods in [Kim et al., 2012] cannot be used to optimize the transient processes of a single-arm cluster tool. For a single-arm tool with such constraints, based on a developed Petri net (PN) model, Qiao et al. [2014] develops a scheduling algorithm and a liner programming model to find an optimal schedule for the start-up process. However, for the close-down process, there is no scheduling method provided in [Qiao et al., 2014]. Although a close-down process is a reverse of a start-up one, their PN models are totally different. Consequently it requires different scheduling methods.

There is a need in the art for a method for scheduling close-down process for single-arm cluster tools with wafer residency time constraints.

SUMMARY OF THE INVENTION

An aspect of the present invention is to provide a method for scheduling a cluster tool for a close-down process with wafer residency time constraints.

According to an embodiment of the present claimed invention, a computer-implemented method for scheduling a cluster tool for a close-down process, the cluster tool comprising a single-arm robot for wafer handling, loadlocks for wafer cassette loading and unloading, and n process modules each for performing a wafer-processing step with a wafer residency time constraint where the ith process module, $i \in \{1, 2, \ldots, n\}$, is used for performing Step i of the n wafer-processing steps for each wafer, the method comprising:

determining, by a processor, a lower workload $\vartheta_{iL}$ of Step i as follows:

$$\vartheta_{iL} = a_i + 4\alpha + 3\mu, i \in N_n \backslash \{1\};$$

$$\vartheta_{1L} = a_1 + 3\alpha + \alpha_0 + 3\mu;$$

determining, by a processor, an upper workload $\vartheta_{iU}$ of Step i as follows:

$$\vartheta_{iU} = a_i + 4\alpha + 3\mu + \delta_i, i \in N_n \backslash \{1\};$$

$$\vartheta_{1U} = a_1 + 3\alpha + \alpha_0 + 3\mu + \delta_1;$$

determining, by a processor, that the workloads are balanced among the Steps if $[\vartheta_{1L}, \vartheta_{1U}] \cap [\vartheta_{2L}, \vartheta_{2U}] \cap \ldots \cap [\vartheta_{nL}, \vartheta_{nU}] \neq \emptyset$;

determining, by a processor, a robot waiting time $\omega_i^d$, $d \leq i \leq n$, $0 \leq d \leq n-1$, and $\omega_n^n$ as follows:

let $\psi_{c0} = \psi_1$, during the period from $M_{cd}$ to $M_{c(d+1)}$, $1 \leq d \leq n-1$, let $\vartheta_{dmax} = \max\{\vartheta_{iL}, i \in N_n \backslash N_{d-1}\}$, $\omega_i^d = 0$, $i \in N_n \backslash N_{d-1}$, and $\omega_n^d = \max\{\vartheta_{dmax} - \psi_{c(d-1)}, 0\}$, where $\psi_{c(d-1)} = 2(n-d+2)\mu + 2(n-d+2)\alpha$, $2 \leq d \leq n$;

during the period from $M_{cn}$ to $M_{ce}$, let $\omega_n^n = a_n$;

determining, by a processor, a schedule for the close-down process based on the robot waiting time determined;

$a_i$, $i \in N_n$, is a time that a wafer is processed in the ith process module;

$\delta_i$ is the wafer residency time constraint of Step i, given by a pre-determined longest time for which a wafer in the ith process module is allowed to stay therein after this wafer is processed;

$\alpha$ is a time of loading a wafer to or unloading the wafer to the robot in Step i;

$\mu$ is a time of the robot moving from one wafer-processing step to another;

$\alpha_0$ is a time of the robot unloading a wafer from the loadlocks and aligning the same;

$M_{cd}$ denote a $d^{th}$ state during the close-down process of the cluster tool; and $M_{ce}$ denote a final state during the close-down process of the cluster tool.

According to an embodiment of the present claimed invention, a computer-implemented method for scheduling a cluster tool for a close-down process, the cluster tool comprising a single-arm robot for wafer handling, a loadlock for wafer cassette loading and unloading, and n process modules each for performing a wafer-processing step with a wafer residency time constraint where the ith process module, i∈{1, 2, ..., n}, is used for performing Step i of the n wafer-processing steps for each wafer, the method comprising:

determining, by a processor, a lower workload $\vartheta_{iL}$ of Step i as follows:

$$\vartheta_{iL}=a_i+4\alpha+3\mu, i\in N_n\backslash\{1\};$$

$$\vartheta_{1L}=a_1+3\alpha+\alpha_0+3\mu;$$

determining, by a processor, an upper workload $\vartheta_{iU}$ of Step i as follows:

$$\vartheta_{iU}=a_i+4\alpha+3\mu+\delta_i, i\in N_n\backslash\{1\};$$

$$\vartheta_{1U}=a_1+3\alpha+\alpha_0+3\mu+\delta_1;$$

determining, by a processor, that the workloads are unbalanced among the Steps if $[\vartheta_{1L}, \vartheta_{1U}]\cap[\vartheta_{2L}, \vartheta_{2U}]\cap \ldots \cap[\vartheta_{nL}, \vartheta_{nU}]=\emptyset$;

determining, by a processor, a robot waiting time $\omega_i^d$, d≤i≤n, 0≤d≤n as follows:

1) $\omega_i^d=\omega_i$, d≤i≤n−1, 0≤d≤n−1 where $\omega_i$ is the robot waiting time at the ith step at steady state, and obtained by:

$$\omega_{i-1} = \begin{cases} 0, & i \in F \\ \vartheta_{max} - (a_1 + \delta_1 + 3\alpha + \alpha_0 + 3\mu), & 1 \in E \\ \vartheta_{max} - (a_i + \delta_i + 4\alpha + 3\mu), & i \in E \cap \{2, 3, 4, \ldots, n\} \end{cases}$$

2) $\omega_n^0=\omega_n$;

3) $\omega_n^d = \vartheta_{max} - \psi_{c(d-1)} - \sum_{i=d-1}^{n-1}\omega_i^{d-1}$, 1≤d≤n−1; and 4) $\omega_n^n=a_n$.

determining, by a processor, a schedule for the close-down process based on the robot waiting time determined;

$a_i$, i∈$N_n$, is a time that a wafer is processed in the ith process module;

$\delta_i$ is the wafer residency time constraint of Step i, given by a pre-determined longest time for which a wafer in the ith process module is allowed to stay therein after this wafer is processed;

α is a time of loading a wafer to or unloading the wafer to the robot in Step i;

μ is a time of the robot moving from one wafer-processing step to another;

$\alpha_0$ is a time of the robot unloading a wafer from the loadlock and aligning the same;

E is {i|i∈$N_n$, $\vartheta_{iU}<\vartheta_{max}$}, where $\vartheta_{max}$=max{$\vartheta_{iL}$, i∈$N_n$};

F is $N_n\backslash E$; and $\psi_{c(d-1)}$=2(n−d+2)μ+2(n−d+2)α, 2≤d≤n.

BRIEF DESCRIPTION OF THE DRAWINGS

Embodiments of the present invention are described in more detail hereinafter with reference to the drawings, in which.

DETAILED DESCRIPTION

Figure 1:
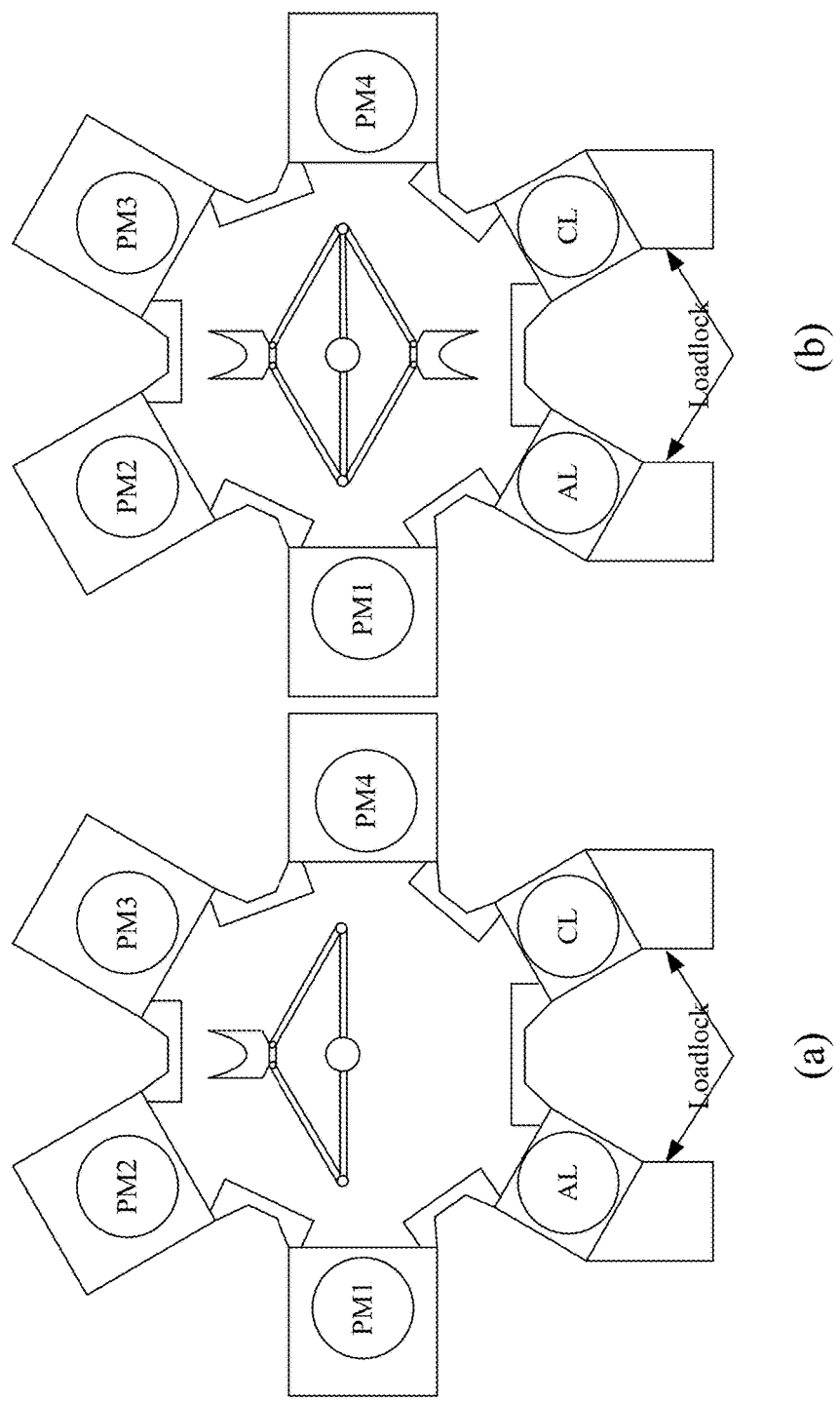
FIG. 1 depicts cluster tools: (a) single-arm robot; (b) dual-arm robot.

In the following description, a method for scheduling close-down process for single-arm cluster tools with wafer residency time constraints is set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The present invention aims to schedule a close-down process of a single-arm cluster tool with wafer residency time constraints, which was not addressed yet. According to the specification of the present invention, Section A presents a Petri net model for the close-down process of a single-arm cluster tool. The schedulability results for single-arm cluster tools [Wu et al., 2008] are reviewed in Section B. Then, a closed-form algorithm and a linear programming model are developed to schedule the close-down process in Section C. Section D presents illustrative examples.

A. PETRI NET MODELING

A.1 Finite Capacity Petri Nets (PNs)

As an effective modeling tool, Petri nets are widely used in modeling, analysis, and control of discrete event systems [Zhou and DiCesare, 1991; Zhou et al., 1992; Zhou et al., 1995; Wu and Zhou, 2001, 2004, 2005, and 2007; Zhou and Jeng, 1998; Liao et al., 2004; Ferrarini and Piroddi, 2008; Jung and Lee, 2012; Liu et al., 2013; Wu et al., 2013c]. Following Zhou and Venkatesh [1998] and Murata [1989], the present invention adopts a finite capacity PN to model a single-arm cluster tool. It is defined as PN=(P, T, I, O, M, K), where P={$p_1, p_2, \ldots, p_m$} is a finite set of places; T={$t_1, t_2, \ldots, t_n$} is a finite set of transitions with P∪T≠∅ and P∩T=∅; I: P×T→N={0, 1, 2, ...} is an input function; O: P×T→N is an output function; M: P→N is a marking representing the count of tokens in places with $M_0$ being the initial marking; and K: P→N\{0} is a capacity function where K(p) represents the count of tokens that p can hold at a time.

The preset of transition t is the set of all input places to t, i.e., ·t={p: p∈P and I(p, t)>0}. Its postset is the set of all output places from t, i.e., t·={p: p∈P and O(p, t)>0}. Similarly, p's preset ·p={t∈T: O(p, t)>0} and postset p·={t∈T: I(p, t)>0}. The transition enabling and firing rules can be found in [Wu and Zhou, 2009].

A.2 PN Model for Cluster Tools

In the present invention, ($m_1, m_2, \ldots, m_n$) is used to describe the wafer flow pattern in a cluster tool, where n is the number of processing steps and $m_i$ is the number of parallel PMs configured for Step i, i∈$N_n$={1, 2, ..., n}. It is assumed that there is only one PM at each step. Thus, one has the wafer flow pattern is ($m_1, m_2, \ldots, m_n$) where $m_i$=1, i∈$N_n$. Based on the PN model, the scheduling analysis of a single-arm cluster tool operating under the steady-state has been well conducted in [Wu et al., 2008]. Then, one briefly introduces the PN model for the steady-state process as developed in [Wu et al., 2008].

Figure 2:
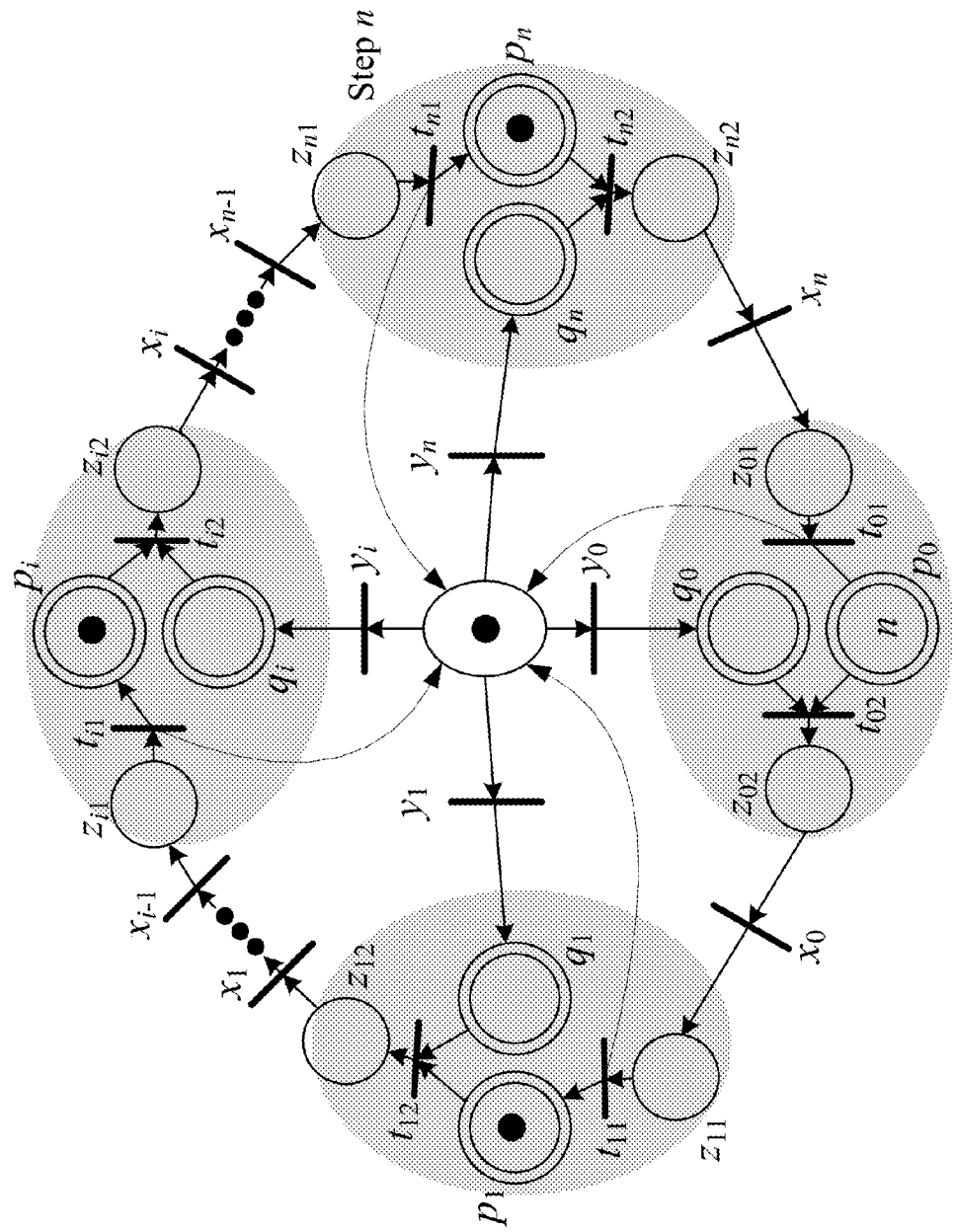
FIG. 2 depicts Petri net for the steady-state of a single-arm cluster tool according to a prior art [Wu et al., 2008]

In the PN model, Step i is modeled by timed place $p_i$ with $K(p_i)=1$, $i \in N_n$. The loadlocks are treated just as a processing step called Step 0. Because the loadlocks can hold all the wafers in a tool, they are modeled by $p_0$ with $K(p_0)=\infty$. The robot is modeled by place r with $K(r)=1$, meaning that it has only one arm and can hold one wafer at a time. When $M(r)=1$, it represents that the robot arm is available. When $M(p_i)=1$, $i \in N_n$, a wafer is being processed in a PM at Step i. In the following discussions, a token in a place, or a wafer in a place, refers to a wafer in its modeled PM when no confusion arises. When the robot arrives at Step i for unloading a wafer, the wafer may be under way. Then, it has to wait there for some time. Timed place $q_i$, $i \in N_n$, is added to model the robot's waiting at Step i before unloading a wafer there and $M(q_i)=1$ means that the robot is waiting at Step i. Non-timed place $z_{ij}$ is used to model the state that it is ready to load a wafer into Step i or the wafer unloading from Step i ends. Transitions are used to model the robot tasks. Timed $t_{i1}$, $i \in N_n$, models loading a wafer into Step i, and $t_{01}$ models loading a completed wafer into a loadlock. Timed $t_{i2}$, $i \in N_n$, models unloading a wafer from Step i, and $t_{02}$ models unloading a raw wafer from a loadlock. Transition $y_i$, $i \in N_{n-2} \cup \{0\}$, represents the robot's moving from Steps i+2 to i without carrying a wafer. Transitions $y_{n-1}$ and $y_n$ represent the robot's moving from a loadlock to Step n-1 and Steps 1 to n, respectively. Transition $x_i$, $i \in N_{n-1} \cup \{0\}$, models the robot's moving from Steps i to i+1 with a wafer held, and $x_n$ models the robot's moving from Steps n to 0. Pictorially, $p_i$'s and $q_i$'s are denoted by ◯, $z_{ij}$'s by ○, and r by ◯. Then, the PN model for a single-arm cluster tool is shown in FIG. 2.

In the steady state, there $\Sigma_{i=1}^n m_i$ wafers being concurrently processed. This means that $m_i$ wafers are being processed at Step i, $i \in N_n$. For the PN model in FIG. 2, at marking M with $M(p_i)=m_i$, $i \in N_n$, and $M(r)=1$, $y_0$ is enabled and firing $y_0$ leads the PN to a dead marking, or the PN is deadlock-prone. Thus, according to [Wu et al., 2008], a control policy is proposed to make it deadlock-free.

Control Policy 1 (CP1):

At any M, transition $y_i$, $i \in N_{n-1} \cup \{0\}$ is said to be control-enabled if $M(p_{i+1})=0$; and $y_n$ is said to be control-enabled if $M(p_i)=1$, $i \in N_n$.

Figure 3:
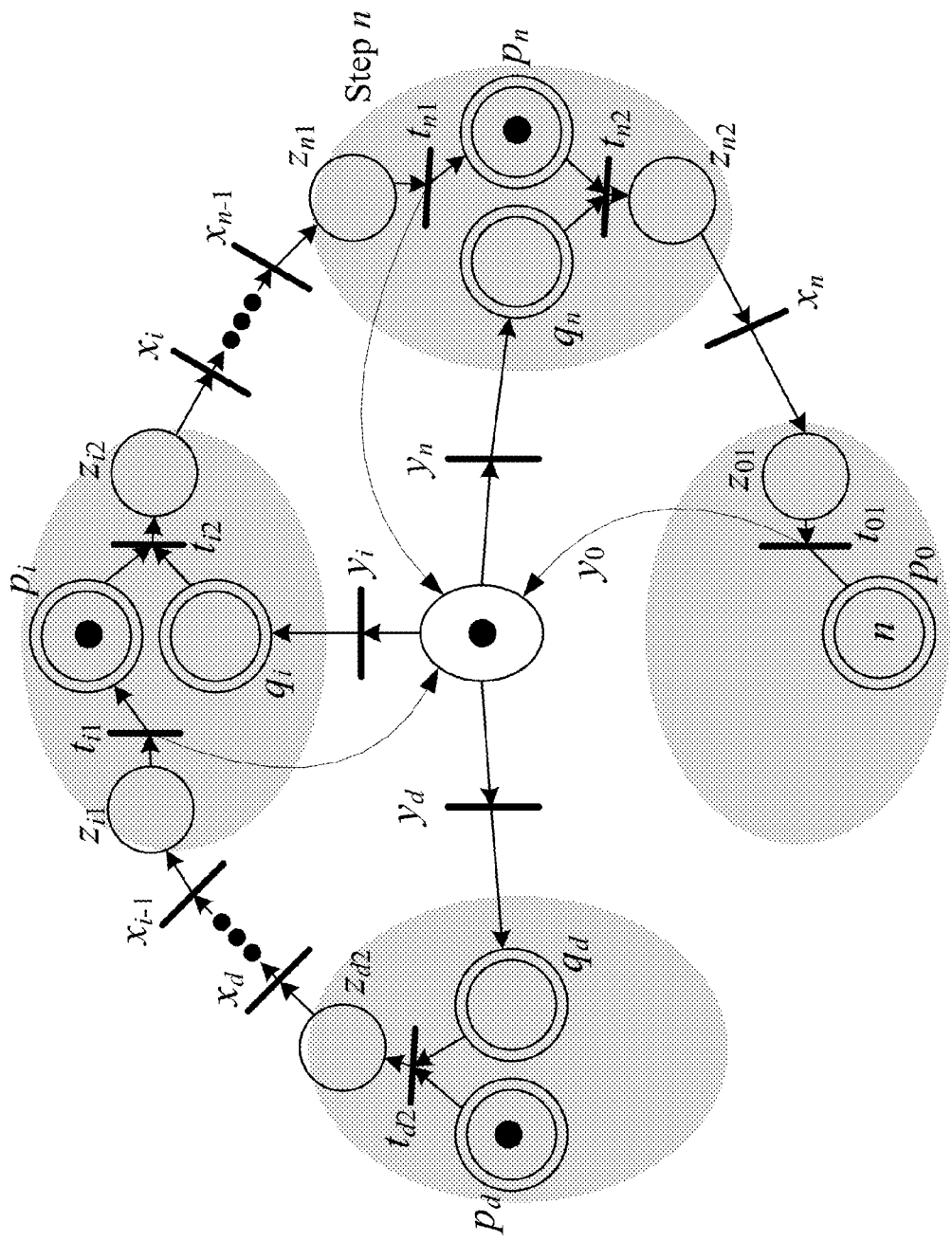
FIG. 3 depicts a Petri net for the close-down process of a single-arm cluster tool according to the present invention.

After the steady state, the cluster tool enters the close-down process. Thus, a Petri net model shown in FIG. 3 is developed to describe the close-down process for a single-arm cluster tool. In the PN model in FIG. 3, the places have the same meanings as the ones in the PN model in FIG. 2. Note that $N_0 = \emptyset$. Transitions $t_{i1}$, $i \in N_n \setminus N_d$ and $1 \le d \le n-1$, $t_{01}$, $t_{i2}$, $i \in N_n \setminus N_{d-1}$ and $1 \le d \le n$, $y_i$, $i \in N_{n-1} \setminus N_d$ and $1 \le d \le n-1$, and $x_i$, $i \in N_n \setminus N_{d-1}$ and $1 \le d \le n$, also have the same meanings as the ones in the PN model in FIG. 3. Transition $y_n$ represent the robot's moving from Steps d to n, $d \le n-1$. If $d=n$, or $M(p_i)=0$, $1 \le i \le n-1$, $M(p_n)=1$, and $M(r)=1$, firing $y_n$ represent the robot start to stay at Step n and it does not take any time for firing $y_n$. Then, a token goes into $q_n$ such that the robot waits at Step n. Because Step i, i $N_n \setminus N_{d-1}$ and $1 \le d \le n-1$, has one wafer being processed and Step i, $N_{d-1}$ and $1 \le d \le n-1$, is empty, one has $M(p_i)=K(p_i)$, $i \in N_n \setminus N_{d-1}$ and $1 \le d \le n-1$, and $M(r)=1$. At the marking shown in FIG. 3, $y_d$ is enabled and can fire. If $y_d$ fires, a token then goes to $z_{d2}$, $z_{(d+1)1}$ sequentially, which leads the PN to a dead marking, or the PN is deadlock. To avoid it, a control policy is given below.

Control Policy 2 (CP2):

For the PN model in FIG. 3, transition $y_i$, $i \in N_{n-1} \setminus N_{d-1}$ and $1 \le d \le n-1$, is said to be control-enabled if $M(p_{i+1})=0$; and $y_n$ is said to be control-enabled if $M(p_i)=1$, $i \in N_n \setminus N_{d-1}$ and $1 \le d \le n$.

With CP2, the close-down process could be described by running the PN model in FIG. 3 shown as follows. Let $M_{ci}$, denote a certain state during the close-down process of the cluster tool. Then, let $M_{c1}$ denote the state of the system when the robot finishes loading wafer W into Step 1 and each Step i ($2 \le i \le n$) has one wafer being processed (W is the last raw wafer released from the loadlock). Thus, one has $M_{c1}(p_i)=K(p_i)$, $i \in N_n$, and $M_{c1}(r)=1$. Note that, when state $M_{c1}$ is reached, the system enters its close-down process. Then, one sets d=1 in the PN model in FIG. 3, according to CP2, the following transition firing sequence denoted by $\sigma_1$ is executed: $\sigma_1 = \langle$ firing $y_n$ (moving to Step n)→firing $t_{n2}$ (unloading a wafer from Step n)→firing $x_n$ (moving from Steps n to 0)→firing $t_{01}$ (loading the wafer into Step 0)→firing $y_{n-1}$ (moving from Steps 0 to n-1)→firing $t_{(n-1)2}$ (unloading a wafer from Step n-2)→firing $x_{(n-1)}$ (moving from Steps n-2 to n-1)→firing $t_{n1}$ (loading the wafer into Step n)→ . . . →firing $y_1$ (moving from Steps 3 to 1)→firing $t_{12}$ (unloading a wafer from Step 1)→firing $x_1$ (moving from Steps 1 to 2)→firing $t_{21}$ (loading the wafer into Step 2)$\rangle$. At this time, let $M_{c2}$ denote the state of the system with $M_{c2}(p_i)=K(p_i)$, $i \in N_n \setminus \{1\}$, $M_{c2}(p_1)=0$, and $M_{c2}(r)=1$. Then, one can set d=2 in the PN model in FIG. 3. According to CP2, the PN model can evolve to state $M_{c3}$ with $M_{c3}(p_i)=K(p_i)$, $i \in N_n \setminus \{1, 2\}$, $M_{c2}(p_i)=0$, $i \in \{1, 2\}$, and $M_{c3}(r)=1$. Similarly, with the PN model in FIG. 3 and CP2, the PN model can evolve to state $M_{cn}$ with $M_{cn}(p_n)=K(p_n)$, $M_{c2}(p_i)=0$, $i \in N_{n-1}$, and $M_{cn}(r)=1$. Then, the robot should wait there until this wafer is completed. After the wafer is processed, the robot unloads it from Step n, moves to Step 0, and loads the wafer into Step 0. In this way, the close-down process ends.

A.3 Modeling Activity Time

For the purpose of scheduling, the temporal aspect of a cluster tool should be described in the PN models in FIGS. 2-3. Both transitions and places are associated with time as given in Table I.

With wafer residency time constraints, the deadlock-freeness does not mean that the PNs shown in FIGS. 2-3 are live, because a token in $p_i$ cannot stay there beyond a given time interval. Let $\tau_i$ be the sojourn time of a token in $p_i$ and $\delta_i$ the longest permissive time for which a wafer can stay in $p_i$ after it is processed. Then, the liveness of the PN model is defined as follows.

TABLE I

TIME DURATIONS ASSOCIATED WITH TRANSITIONS AND PLACES

| T or P | Actions | Time |
|---|---|---|
| $t_{i1}$, $i \in N_n \cup \{0\}$ | Robot loads a wafer into Step i, $i \in N_n \cup \{0\}$ | $\alpha$ |
| $t_{i2}$, $i \in N_n$ | Robot unloads a wafer from Step i, $i \in N_n$ | |
| $t_{02}$ | Robot unloads a wafer from a loadlock and aligns it | $\alpha_0$ |
| $y_i$ | Robot moves from a step to another without carrying a wafer | $\mu$ |
| $x_i$ | Robot moves from a step to another with a wafer carried | |

TABLE I-continued

TIME DURATIONS ASSOCIATED
WITH TRANSITIONS AND PLACES

| T or P | Actions | Time |
|---|---|---|
| $p_i$ | A wafer being processed in $p_i$, $i \in N_n$ | $a_i$ |
| $q_i$, $i \in N_n \cup \{0\}$ | Robot waits before unloading a wafer from Step i, $i \in N_n \cup \{0\}$ | $\omega_i$ |
| $z_{ij}$ | No activity is associated | |

Definition 2.1:

If the PN models for single-arm cluster tools with residency time constraints are live, one has: 1) at any marking with a token in $p_i$, $\forall i \in N_n$, and when $t_{i2}$ fires, $a_i \leq \tau_i \leq a_i + \delta_i$ holds for the net in FIG. 2; and 2) at any marking with a token in $p_i$, $i \in N_n \backslash N_{d-1}$ and $1 \leq d \leq n$, and when $t_{i2}$ fires, $a_i \leq \tau_i \leq a_i + \delta_i$ holds for the net in FIG. 3.

B. SCHEDULING ANALYSIS

For a single-arm cluster tool with wafer residency time constraints, before discussing how to schedule its closedown process, one recalls the scheduling analysis results for its steady state process [Wu et al., 2008].

B.1 Timeliness Analysis for Steady State

It follows from [Wu et al., 2008] that, to complete the processing of a wafer at Step i, $i \in N_n \backslash \{1\}$, it takes $\tau_i + 4\alpha + 3\mu + \omega_{i-1}$ time units, where $\tau_i$ should be within $[a_i, a_i + \delta_i]$. With one PMs at Step i, $i \in N_n$, one has that the lower bound of permissive cycle time at Step i is $$\theta_{iL} = a_i + 4\alpha + 3\mu + \omega_{i-1}, \; i \in N_n \backslash \{1\} \quad (3.1)$$

The upper bound of permissive cycle time at Step i is $$\theta_{iU} = a_i + 4\alpha + 3\mu + \omega_{i-1} + \delta_i, \; i \in N_n \backslash \{1\} \quad (3.2)$$

For Step 1, the lower one is $$\theta_{iL} = a_1 + 3\alpha + \alpha_0 + 3\mu + \omega_0 \quad (3.3)$$

Its upper one is $$\theta_{1U} = a_1 + 3\alpha + \alpha_0 + 3\mu + \omega_0 + \delta_1 \quad (3.4)$$

It follows from (3.1)-(3.4) that the permissive wafer sojourn time can be affected by the robot waiting time $\omega_i$. By removing it from the above expressions, one can obtain the lower and upper workloads of each step as follows.

$$\vartheta_{iL} = a_i + 4\alpha + 3\mu, \; i \in N_n \backslash \{1\} \quad (3.5)$$

$$\vartheta_{iU} = a_i + 4\alpha + 3\mu + \delta_i, \; i \in N_n \backslash \{1\} \quad (3.6)$$

$$\vartheta_{1L} = a_1 + 3\alpha + \alpha_0 + 3\mu \quad (3.7)$$

$$\vartheta_{1U} = a_1 + 3\alpha + \alpha_0 + 3\mu + \delta_1 \quad (3.8)$$

To schedule a single-arm cluster tool with residency time constraints, one has to ensure $a_i \leq \tau_i \leq a_i + \delta_i$. Hence, one needs to know how $\tau_i$ is calculated. According to [Wu et al., 2008], one has $$\tau_i = 2(n+1)\mu + (2n+1)\alpha + \alpha_0 + \Sigma_{d=0}^n \omega_d - (4\alpha + 3\mu + \omega_{i-1}) = \psi - (4\alpha + 3\mu + \omega_{i-1}), \; i \in N_n \backslash \{1\} \quad (3.9)$$

$$\tau_1 = 2(n+1)\mu + (2n+1)\alpha + \alpha_0 + \Sigma_{d=0}^n \omega_d - (3\alpha + \alpha_0 + 3\mu + \omega_0) = \psi - (3\alpha + \alpha_0 + 3\mu + \omega_0) \quad (3.10)$$

The robot cycle time is $$\psi = 2(n+1)\mu + (2n+1)\alpha + \alpha_0 + \Sigma_{d=0}^n \omega_d = \psi_1 + \psi_2 \quad (3.11)$$

where $\psi_1 = 2(n+1)\mu + (2n+1)\alpha + \alpha_0$ is a known constant and $\psi_2 = \Sigma_{d=0}^n \omega_d$ is to be decided by a schedule.

Let $\theta_1 = \tau_1 + 3\alpha + \alpha_0 + 3\mu + \omega_0$ and $\theta_i = \tau_i + 4\alpha + 3\mu + \omega_{i-1}$, $i \in N_n \backslash \{1\}$, denote the cycle time for step i, $i \in N_n$. Then, it can be seen that, by making $\omega_{i-1} > 0$, the cycle time of Step i is increased without increasing the wafer sojourn time. Thus, it is possible to adjust the robot waiting time to balance the wafer sojourn time among the steps such that a feasible schedule can be obtained. Following Wu et al. [2008], for a periodic schedule for the steady state, one has $$\theta = \theta_1 = \theta_2 = \ldots = \theta_n = \psi \quad (3.12)$$

In (3.11), $\mu$, $\alpha$, and $\alpha_0$ are constants, only $\omega_d$'s $d \in N_n \cup \{0\}$, are variables, i.e., $\psi_1$ is deterministic and $\psi_2$ can be regulated. Thus, with the PN model in FIG. 2, a feasible and optimal schedule can be found by properly setting $\omega_d$'s, $d \in N_n \cup \{0\}$, for a single-arm cluster tool.

B.2 Schedulability Conditions and Scheduling for Steady State

To find a feasible cyclic schedule, the key is to know under what conditions there exist $\theta$ such that the system is schedulable. It is known that, in (3.5)-(3.8), $\vartheta_{iL}$ and $\vartheta_{iU}$ denote the lower and upper bounds of $\theta_i$, respectively. Let $\vartheta_{max} = \max\{\vartheta_{iL}, i \in N_n\}$. Then, Wu et al. [2008] developed the sufficient and necessary schedulability conditions shown below.

Theorem 3.1 [Wu et al., 2008]:

If $\vartheta_{max} \leq \vartheta_{iU}$ and $\psi_1 \leq \vartheta_{iU}$, $i \in N_n$, a single-arm cluster tool with residency time constraints is schedulable.

For this case, if $\vartheta_{max} \leq \vartheta_{iU}$ and $\psi_1 \leq \vartheta_{max}$, $i \in N_n$, the tool is process-bound. If $\vartheta_{iL} \leq \psi_1 \leq \vartheta_{iU}$, $i \in N_n$, it is transport-bound. With $\vartheta_{max} \leq \vartheta_{iU}$, $i \in N_n$, the difference of the workloads among the steps is not too large. Thus, with $\omega_i$'s being set appropriately, the workloads among the steps can be balanced such that a feasible schedule can be found. It follows from [Wu et al., 2008] that, in this case, one can simply set $\omega_i = 0$, $i \in N_{n-1} \cup \{0\}$, and $\omega_n = \max\{\vartheta_{max} - \psi_1, 0\}$ such that $\psi = \max\{\vartheta_{max}, \psi_1\}$ holds. In this way, a feasible schedule is determined. Further, it is optimal in terms of cycle time.

Theorem 3.1 shows that the difference of the workloads among the steps is not too large, i.e., $\cap_{j \in N_n} [\vartheta_{jL}, \vartheta_{jU}] \neq \emptyset$. However, for some cases, $\cap_{j \in N_n} [\vartheta_{jL}, \vartheta_{jU}] = \emptyset$ holds. It follows from [Wu et al., 2008] that the time taken for completing a wafer at Step i can be increased by increasing $\omega_{i-1}$ without changing the sojourn time $\tau_i$. Hence, a cluster tool can be scheduled for these cases with $\cap_{j \in N_n} [\vartheta_{jL}, \vartheta_{jU}] = \emptyset$ by properly setting $\omega_{i-1}$'s. Then, let $E = \{i | i \in N_n, \vartheta_{iU} < \vartheta_{max}\}$ and $F = N_n \backslash E$. To do so, one can set $\omega_{i-1}$'s as follows.

$$\omega_{i-1} = \begin{cases} 0, & i \in F \\ \vartheta_{max} - (a_1 + \delta_1 + 3\alpha + \alpha_0 + 3\mu), & 1 \in E \\ \vartheta_{max} - (a_i + \delta_i + 4\alpha + 3\mu), & i \in E \cap \{2, 3, 4, \ldots, n\} \end{cases} \quad (3.13)$$

Theorem 3.2 [Wu et al., 2008]:

If $\cap_{j \in N_n} [\vartheta_{jL}, \vartheta_{jU}] = \emptyset$, $\vartheta_{iU} < \vartheta_{max}$ with $i \in E \neq \emptyset$, $\vartheta_{iU} \geq \vartheta_{max}$ with $i \in F$, and $\Sigma_{i \in E} \omega_{i-1} + \psi_1 \leq \vartheta_{max}$, a single-arm cluster tool with residency time constraints is schedulable when $\omega_{i-1}$, $i \in N_n$, are set by (3.13).

In this case, with the obtained $\omega_{i-1}$, $i \in N_n$, by (3.13), the workload among the steps can be well balanced. Notice that, by (3.13), the robot waiting time $\omega_{i-1}$, $i \in N_n$, is set, and then set $\omega_n = \vartheta_{max} - (\psi_1 + \Sigma_{i \in E} \omega_{i-1})$ such that $\psi = \vartheta_{max}$ holds. Thus, a feasible schedule is obtained. Further, the cycle time of the tool is optimal. According to [Wu et al., 2008], the schedulability conditions given by Theorems 3.1 and 3.2 are the sufficient and necessary for the steady state scheduling.

Based on them, in the next section, one conducts the scheduling analysis for the close-down process.

C. SCHEDULING ANALYSIS FOR CLOSE-DOWN PROCESS

C.1 Temporal Properties in Close-Down Process

Let $M_{c0}$ denote the state with $M_{c0}(p_i)=K(p_i)$, $i \in N_n$, $M_{c0}(r)=1$, and there is only one raw wafer in the loadlocks. In other words, the robot task sequence from $M_{c0}$ to $M_{c1}$ is the last robot task cycle for the steady state. Then, the system operates according to the PN model in FIG. 3 and CP1 such that $M_{c1}$ is reached. For state $M_{c1}$, Step i, $i \in N_n$, has one wafer being processed and the robot stays at Step 1. In other words, $M_{c1}(p_i)=K(p_i)$, $i \in N_n$, and $M_{c1}(r)=1$. It is assumed that when $M_{c1}$ is reached, there is no raw wafer in the loadlocks and the system enters its close-down process.

During the evolution from $M_{cd}$ to $M_{c(d+1)}$, the robot should sequentially move to Steps n, n−1, ..., d+1, and d to unload the processed wafers. Thus, with wafer residency time constraints considered, it is necessary to determine how long a wafer visits Step i, $i \in N_n \setminus N_{d-1}$. With the PN model in FIG. 3 and CP2, $M_{c2}$ can be reached from $M_{c1}$, $M_{c3}$ can be reached from $M_{c2}$, ..., $M_{cn}$ can be reached from $M_{c(n-1)}$. When $M_{cn}$ is reached, the robot has just loaded a wafer into Step n. Then, the robot should wait there. When the wafer being processed at Step n is completed, the robot unloads it immediately, and then delivers it to the loadlock. At this time, all the wafers are out of the system, and it is the end of the close-down denoted by $M_{ce}$. In fact, the evolutions from $M_{c1}$ to $M_{ce}$ form a close-down process. During the close-down process, the robot task sequence is deterministic and the robot waiting time is unknown. Thus, to obtain an optimal feasible schedule for the close-down process, it is very important to find a way to adjust the robot waiting time such that the wafer residency time constraints can be satisfied. However, the robot waiting time would affect the wafer sojourn time. Thus, firstly, the key is to know how to determine the wafer sojourn time.

Let $\omega_i^d$, $d \le i \le n$, $0 \le d \le n-1$, and $\omega_n^n$ denote robot waiting time in places $q_i$ and $q_n$ during the evolutions from $M_{cd}$ to $M_{c(d+1)}$ and $M_{cn}$ to $M_{ce}$, respectively. At $M_{c0}$), there is only one raw wafer in the loadlocks and let $W_1$ denote it. During the evolution from $M_{c0}$ to $M_{c1}$, according to the model in FIG. 2 and CP1, the following transition firing sequence is executed: firing $y_n$ (time $\mu$)→the robot waits in $q_n$ ($\omega_n^0$)→ firing $t_{n2}$ (time $\alpha$)→firing $x_n$ (time $\mu$)→firing $t_{01}$ (time $\alpha$)→ ... →$y_0$ (time $\mu$) the robot waits in $q_0$ ($\omega_0^0$)→ firing $t_{02}$ (time $\alpha_0$)→firing $x_0$ (time $\mu$)→firing $t_{11}$ (time $\alpha$) with wafer $W_1$ being loaded into Step 1. Then, by the model in FIG. 3 and CP2, to reach $M_{c2}$ from $M_{c1}$, the following transition firing sequence is executed: firing $y_n$ (time $\mu$)→the robot waits in $q_n$ ($\omega_n^1$)→firing $t_{n2}$ (time $\alpha$)→firing $x_n$ (time $\mu$)→firing $t_{01}$ (time $\alpha$)→ ... →firing $y_1$ (time $\mu$)→the robot waits in $q_1$ ($\omega_1^1$)→firing $t_{12}$ (time $\alpha$)→firing $x_1$ (time $\mu$)→firing $t_{21}$ (time $\alpha$) with wafer $W_1$ being loaded into Step 2. Thus, when the robot arrives at Step 1 during the evolution from $M_{c1}$ to $M_{c2}$, the wafer sojourn time at Step 1 is $$\tau_1 = [2(n+1)\mu + (2n+1)\alpha + \alpha_0] + \Sigma_1^n \omega_j^1 - (3\alpha + \alpha_0 + 3\mu) \quad (4.1)$$

Similarly, when the robot arrives at Step d during the evolution from $M_{cd}$ to $M_{c(d+1)}$, $2 \le d \le n-1$, the wafer sojourn time at Step d is $$\tau_d = [2(n-d+2)\mu + 2(n-d+2)\alpha] \Sigma_d^n \omega_j^d - (4\alpha + 3\mu) \quad (4.2)$$

When the robot arrives at Step i, $2 \le i \le n$, during the evolution from $M_{c1}$ to $M_{c2}$, the wafer sojourn time at Step i is $$\tau_i = [2(n+1)\mu + (2n+1)\alpha + \alpha_0] + \Sigma_0^{i-2} \omega_j^0 + \Sigma_i^n \omega_j^1 - (4\alpha + 3\mu) \quad (4.3)$$

When the robot arrives at Step i, $d+1 \le i \le n$, during the evolution from $M_{cd}$ to $M_{c(d-1)}$, $2 \le d \le n-1$, the wafer sojourn time at Step d is $$\tau_i = [2(n-d+2)\mu + 2(n-d+2)\alpha] + \Sigma_{d-1}^{i-2} \omega_j^{d-1} + \Sigma_i^n \omega_j^d - (4\alpha + 3\mu) \quad (4.4)$$

During the evolution from $M_{cn}$ to $M_{ce}$, the wafer sojourn time at Step n is $$\tau_n = \omega_n^n \quad (4.5)$$

Due to $\psi_1 = 2(n+1)\mu + (2n+1)\alpha + \alpha_0$, expressions (4.1) and (4.3) can be respectively rewritten as $$\tau_1 = \psi_1 + \Sigma_1^n \omega_j^1 - (3\alpha + \alpha_0 + 3\mu) \quad (4.6)$$

$$\tau_i = \psi_1 + \Sigma_0^{i-2} \omega_j^0 + \Sigma_i^n \omega_j^1 + (4\alpha + 3\mu) \quad (4.7)$$

Let $\psi_{c(d-1)}$, $2 \le s \le n$, and $\psi_{cn}$ denote the robot task time for transferring the tool from $M_{c(d-1)}$ to $M_{cd}$ and $M_{cn}$ to $M_e$ without considering the robot waiting time, respectively. Then, one has $$\psi_{c(d-1)} = 2(n-d+2)\mu + 2(n-d+2)\alpha, \ 2 \le d \le n \quad (4.8)$$

$$\psi_{cn} = \mu + 2\alpha \quad (4.9)$$

Thus, from (4.8), expressions (4.2) and (4.4) can be rewritten as $$\tau_d = \psi_{c(d-1)} + \Sigma_d^n \omega_j^d - (4\alpha + 3\mu) \quad (4.10)$$

$$\tau_i = \psi_{c(d-1)} + \Sigma_{d-1}^{i-2} \omega_j^{d-1} + \Sigma_i^n \omega_j^d - (4\alpha + 3\mu) \quad (4.11)$$

Then, one discusses how to regulate the robot waiting time such that the residency time constraints at all steps are satisfied.

C.2 Scheduling for Close-down Process

Feasibility is an essential requirement for scheduling a transient process of a cluster tool. From the above analysis, one knows that the robot task sequence during the evolution from $M_{c1}$ to $M_{ce}$ is determined. Thus, it is very important to determine the robot waiting time during the close-down process such that the residency time constraints are met at each step. Thus, one has the schedulability results next.

Proposition 4.1:

A cluster tool with wafer residency constraints in a close-down process is schedulable if the robot waiting time during the period from $M_{c1}$ to $M_{ce}$ can be found such that the constraint at each step is satisfied.

Generally, a cluster tool has not less than two steps. By the PN model in FIG. 3 and CP2, the cluster tool can operate from $M_{cd}$ to $M_{cn}$, $1 \le d \le n-1$. Then, after $M_{cn}$, the following transition firing sequence is executed: robot waiting at $q_n$ (time $a_n$)→firing $t_{n2}$ (time $\alpha$)→firing $x_n$ (time $\mu$)→firing $t_{01}$ (time $\alpha$). At this time, the close-down process ends. Thus, by Proposition 4.1, one only needs to find ways to set the robot waiting time during the period from $M_{c1}$ to $M_{ce}$ such that the constraint at each step can be satisfied. To do so, one develops the following algorithms to set the robot waiting time.

Scheduling Algorithm 4.1:

If $\vartheta_{max} \le \vartheta_{iU}$ and $\psi_1 \le \vartheta_{iU}$, $i \in N_n$, the robot waiting time is set as follows:

1) Let $\psi_{c0} = \psi_1$. During the period from $M_{cd}$ to $M_{c(d-1)}$, $1 \le d \le n-1$, the tool operates according to the model in FIG. 3 and CP 2. Let $\vartheta_{dmax} = \max\{\vartheta_{iL}, i \in N_n \setminus N_{d-1}\}$, $\omega_i^d = 0$, $i \in N_n \setminus N_{d-1}$, and $\omega_n^d = \max\{\vartheta_{dmax} - \psi_{c(d-1)}, 0\}$;

2) During the period from $M_{cn}$ to $M_{ce}$, let $\omega_n{}^n = a_n$.

According to Algorithm 4.1, during the period from $M_{cd}$ to $M_{c(d+1)}$, $1 \le d \le n-1$, Step i with $1 \le i \le d-1$, is empty. Thus, $\vartheta_{dmax}$ depends on the bottleneck step from steps d to n. With $\omega_i = 0$, $i \in N_n \setminus N_{d-1}$, and $\omega_n = \max\{\vartheta_{dmax} - \psi_{c(d-1)}, 0\}$, the residency time constraints at Steps d to n are satisfied and the time to complete each Step $i \in N_n \setminus N_{d-1}$, is expected to be shortest in the permissive range. Finally, during the period from $M_{cn}$ to $M_{ce}$, after the robot loads a wafer into Step n, it only waits there for the end of wafer processing and unloads the wafer immediately. One can show that this is feasible by the following theorem.

Theorem 4.1:

For a single-arm cluster tool with wafer residency time constraints, if $\vartheta_{max} \le \vartheta_{iU}$, $\psi_1 \le \vartheta_{iU}$, $i \in N_n$, a schedule obtained by Algorithm 4.1 for the close-down process is feasible.

Proof:

With the PN model in FIG. 2 and CP1, the cluster tool can reach $M_{c1}$ from $M_{c0}$. Notice that the process from $M_{c0}$ to $M_{c1}$ is under the steady state. Therefore, one has $\omega_i{}^0 = 0$, $i \in N_n \cup \{0\}$, and $\omega_n{}^0 = \max\{\vartheta_{max} - \psi_1, 0\}$. Then, based on Rule 1) in Algorithm 4.1, from expressions (4.1) and (4.6). one has $\tau_1 = \psi_1 + \Sigma_1{}^n \omega_j{}^1 - (3\alpha + \alpha_0 + 3\mu) = \psi_1 + \max\{\vartheta_{1max} - \psi_1, 0\} - (3\alpha + \alpha_0 + 3\mu)$. If $\psi_1 \le \vartheta_{1max}$ leading to $\max\{\vartheta_{1max} - \psi_1, 0\} = 0$, from (3.7)-(3.8) and the assumption of $\vartheta_{max} \le \vartheta_{iU}$, $\psi_1 \le \vartheta_{iU}$, $i \in N_n$, one has $a_1 \le \vartheta_{1L} - (3\alpha + \alpha_0 + 3\mu) \le \tau_1 = \psi_1 - (3\alpha + \alpha_0 + 3\mu) \le \vartheta_{1U} - (3\alpha + \alpha_0 + 3\mu) \le a_1 + \delta_1$. If $\psi_1 < \vartheta_{1max}$ leading to $\max\{\vartheta_{1max} - \psi_1, 0\} = \vartheta_{1max} - \psi_1$, from (3.7), (3.8), and the assumption of $\vartheta_{max} \le \vartheta_{iU}$, $\psi_1 \le \vartheta_{iU}$, $i \in N_n$, one has $a_1 \le \vartheta_{1L} - (3\alpha + \alpha_0 + 3\mu) \le \tau_1 = \vartheta_{1max} - (3\alpha + \alpha_0 + 3\mu) \le \vartheta_{1U} - (3\alpha + \alpha_0 + 3\mu) \le a_1 + \delta_1$. Thus, when the robot arrives at Step 1 for unloading a wafer during the evolution from $M_{c1}$ to $M_{c2}$, the wafer residency time constraint at Step 1 is not violated. Similarly, based on Rule 1) in Algorithm 4.1, (3.5), (3.6), (4.3), (4.7), and the assumption of $\vartheta_{max} \le \vartheta_{iU}$, $\psi_1 \le \vartheta_{iU}$, $i \in N_n$, one has $a_i \le \tau_i \le a_i + \delta_1$, $2 \le i \le n$, when the robot arrives at Step i, $2 \le i \le n$, for unloading a wafer during the evolution from $M_{c1}$ to $M_{c2}$. This means that when the robot arrives at Step i, $2 \le i \le n$, for unloading a wafer during the evolution from $M_{c1}$ to $M_{c2}$, the wafer residency time at Step i is not violated.

When the robot arrives at Step d during the evolution from $M_{cd}$ to $M_{c(d+1)}$, $2 \le d \le n-1$, for unloading a wafer, based on Rule 1) in Algorithm 4.1, it follows from expressions (4.2) and (4.10) that the wafer sojourn time at Step d is $\tau_d = \psi_{c(d-1)} + \Sigma_d{}^n \omega_j{}^d - (4\alpha + 3\mu) = \psi_{c(d-1)} + \max\{\vartheta_{dmax} - \psi_{c(d-1)}, 0\} - (4\alpha + 3\mu)$. If $\psi_{c(d-1)} \ge \vartheta_{dmax}$ leading to $\max\{\vartheta_{dmax} - \psi_{c(d-1)}, 0\} = 0$, from (3.5), (3.6), and the assumption of $\vartheta_{max} \le \vartheta_{iU}$, $\psi_1 \le \vartheta_{iU}$, $i \in N_n$, one has that $a_d \le \vartheta_{dL} - (4\alpha + 3\mu) \le \vartheta_{dmax} - (4\alpha + 3\mu) \le \tau_d = \psi_{c(d-1)} - (4\alpha + 3\mu) < \psi_1 - (4\alpha + 3\mu) \le \vartheta_{dU} - (4\alpha + 3\mu) \le a_d + \delta_d$. If $\psi_{c(d-1)} < \vartheta_{dmax}$ leading to $\max\{\vartheta_{dmax} - \psi_{c(d-1)}, 0\} = \vartheta_{dmax} - \psi_{c(d-1)}$, from (3.5), (3.6), and the assumption of $\vartheta_{max} \le \vartheta_{iU}$, $\psi_1 \le \vartheta_{iU}$, $i \in N_n$, one has that $a_d \le \vartheta_{dL} - (4\alpha + 3\mu) \le \tau_d = \vartheta_{dmax} - (4\alpha + 3\mu) \le \vartheta_{dU} - (4\alpha + 3\mu) \le a_d + \delta_d$. Thus, when the robot arrives at Step d during the evolution from $M_{cd}$ to $M_{c(d+1)}$, $2 \le d \le n-1$, for unloading a wafer, the wafer residency time at Step d is not violated. Similarly, based on Rule 1) in Algorithm 4.1, (3.5), (3.6), (4.4), (4.11), and the assumption of $\vartheta_{max} \le \vartheta_{iU}$, $\psi_1 \le \vartheta_{iU}$, $i \in N_n$, one has that $a_i \le \tau_i \le a_i + \delta_1$, $d < i \le n$, when the robot arrives at Step i, $d < i \le n$, for unloading a wafer during the evolution from $M_{cd}$ to $M_{c(d+1)}$, $2 \le d \le n-1$. This means that when the robot arrives at Step i, $d < i \le n$, for unloading a wafer during the evolution from $M_{cd}$ to $M_{c(d+1)}$, $2 \le d \le n-1$, the wafer residency time at Step i is not violated.

During the period from $M_{cn}$ to $M_{ce}$, based on Rule 2) in Algorithm 4.1 and expression (4.5), one has $\tau_n = a_n$. Hence, from all the above analysis, during the close-down process from $M_{c1}$ to $M_{ce}$, the wafer residency time constraints are all satisfied, or the theorem holds.

During the period from $M_{c1}$ to $M_{c2}$, $\omega_i{}^1 = \omega_i{}^0$, $i \in N_n$, it is obvious that residency constraints are satisfied. $\vartheta_{max} \le \vartheta_{iU}$, $\psi_1 \le \vartheta_{iU}$, $i \in N_n$, implies the workloads among the steps are properly balanced. During the period from $M_{cd}$ to $M_{c(d+1)}$, $2 \le d \le n-1$, $\psi_{c(d-1)}$, decreases as d increases. If $\vartheta_{dmax} \ge \psi_{c(d-1)}$, the cluster tool operates in a process-bound region. If $\vartheta_{dmax} < \psi_{c(d-1)}$, it operates in a transport-bound region. Due to the varied $\psi_{c(d-1)}$ as d increases, the cluster tool may operate in a process-bound region in the next state. Thus, one has to adjust the robot waiting time dynamically to meet the residency constraints by Algorithm 4.1, which assigns the robot waiting time to the last step. Theorem 4.1 guarantees that the obtained schedule by Algorithm 4.1 is feasible to satisfy the residency constraints. Further, one has the following theorem to show its optimality.

Theorem 4.2:

For a single-arm cluster tool with residency time constraints, if $\vartheta_{max} \le \vartheta_{iU}$, $\psi_1 \le \vartheta_{iU}$, $i \in N_n$, a schedule obtained by Algorithm 4.1 is optimal for the close-down process.

Proof:

Without loss of generality, let $\vartheta_{max} = \vartheta_{nL}$. During the period from $M_{c1}$ to $M_{c2}$, by (4.3) and Rule 1) of Algorithm 4.1 one has that $\tau_n[2(n+1)\mu + (2n+1)\alpha + \alpha_0] + \Sigma_0{}^{n-2} \omega_j{}^0 + \Sigma_n{}^n \omega_j{}^1 - (4\alpha + 3\mu) = [2(n+1)\mu + (2n+1)\alpha + \alpha_0] + \omega_n{}^1 - (4\alpha + 3\mu) = [2(n+1)\mu + (2n+1)\alpha + \alpha_0] + \max\{\vartheta_{dmax} - \psi_1, 0\} - (4\alpha + 3\mu) = \psi_1 + \max\{\vartheta_{max} - \psi_1, 0\} - (4\alpha + 3\mu)$, if $\vartheta_{max} \ge \psi_1$, $\tau_n = \psi_1 + \vartheta_{dmax} - \psi_1 - (4\alpha + 3\mu) = \vartheta_{nL} - (4\alpha + 3\mu) = a_n$. If $\vartheta_{dmax} < \psi_1$, $\tau_n = \psi_1 - (4\alpha + 3\mu)$ cannot be shortened. During the period from $M_{cd}$ to $M_{c(d-1)}$, $2 \le d \le n-1$, $\tau_n = [2(n-d+2)\mu + 2(n-d+2)\alpha] + \Sigma_{d-1}{}^{n-2} \omega_j{}^{d-1} + \Sigma_n{}^n \omega_j{}^d - (4\alpha + 3\mu) = [2(n-d+2)\mu + 2(n-d+2)\alpha] + \omega_n{}^d - (4\alpha + 3\mu) = [2(n-d+2)\mu + 2(n-d+2)\alpha] + \max\{\vartheta_{max} - \psi_{c(d-1)}, 0\} - (4\alpha + 3\mu)$, if $\vartheta_{dmax} \ge \psi_{c(d-1)}$, $\tau_n = \vartheta_{dmax} - (4\alpha + 3\mu) = \vartheta_{nL} - (4\alpha + 3\mu) = a_n$. If $\vartheta_{dmax} < \psi_{c(d-1)}$, $\tau_n = \psi_{c(d-1)} - (4\alpha + 3\mu)$ cannot be shortened. Since $\omega_i{}^d = 0$, $i \in N_n \setminus N_{d-1}$, $1 \le d \le n-1$, the period from $M_{cd}$ to $M_{c(d+1)}$, $1 \le d \le n-1$, is determined by $\tau_n$ and minimized. By Rule 2), during the period from $M_{cn}$ to $M_{ce}$, $\tau_n = a_n$ is also minimized. Thus, during the period from $M_{c1}$ to $M_{ce}$, $\tau_n$ is minimized. That is to say, the time span of the close-down process is minimal. Therefore, a schedule obtained by Algorithm 4.1 is optimal for the close-down process.

The conditions in Theorem 4.1 indicates that the workloads among the steps are well balanced, i.e., $\cap_{j \in N_n}[\vartheta_{jL}, \vartheta_{jU}] \ne \emptyset$. However, when $\cap_{j \in N_n}[\vartheta_{jL}, \vartheta_{jU}] = \emptyset$ holds, it means that the workloads among the steps are too large. Let $E = \{i | i \in N_n$ and $\vartheta_{iU} < \vartheta_{max}\}$ and $F = N_n \setminus E$. For this case, Wu et al. [2008] have found that a feasible schedule can be obtained by setting $\omega_{i-1} > 0$ $i \in E$. In this way, the wafer sojourn time $\tau_i$ can be reduced such that the wafer residency time constraints at Step i are met. For the close-down process, the time taken for the process from $M_{cd}$ to $M_{c(d+1)}$ and $M_{c(d+1)}$ to $M_{c(d+2)}$ may be different. Thus, in order to obtain an optimal feasible schedule for the close-down process, the key is to dynamically adjust the robot waiting time in $q_{i-1}$, $i \in E$, during the evolution from $M_{cd}$ to $M_{c(d+1)}$. However, increasing and decreasing the robot waiting time in $q_{i-1}$, $i \in E$, would decrease or increase the wafer sojourn time $\tau_i$ at Step i during the evolution from $M_{c(d+1)}$ to $M_{c(d+2)}$, respectively. This makes it difficult to guarantee both the feasibility and optimality. Thus, one develops a linear programming model to tackle this issue. During the process from $M_{cd}$ to $M_{c(d+1)}$, let $\beta_{ij}{}^d$ denote the time to start firing $t_{ij}$ (j=1, 2). Then, the linear programming model is formulated as follows.

Linear Programming Model (LPM):

If $\cap_{j\in N_n}[\vartheta_{jL},\vartheta_{jU}]=\emptyset$ and the system is schedulable under the steady state, with $\omega_i^0$, $1\leq i\leq n$, set by (3.13), then a schedule can be found by the following linear programming model.

$$\min \sum_{d=1}^{n}\sum_{i=d}^{n}\omega_i^d \quad (4.12)$$

Subject to:

$\omega_i^1=\omega_i^0$, $1\leq i\leq n$ (4.13)

$\beta_{n2}^1=\mu+\omega_n^1$ (4.14)

$\beta_{01}^d=\beta_{n2}^d+\alpha+\mu$, $1\leq d\leq n-1$ (4.15)

$\beta_{i2}^d=\beta_{(i+1)2}^d+2(\alpha+\mu)+\omega_i^d$, $d\leq i\leq n-1$ and $1\leq d\leq n-1$ (4.16)

$\beta_{i1}^d=\beta_{(i-1)2}^d+\alpha+\mu$, $d+1\leq i\leq n-1$ and $1\leq d\leq n-1$ (4.17)

$\beta_{n1}^d=\beta_{01}^d+2(\alpha+\mu)+\omega_{n-1}^d$, $1\leq d\leq n-1$ (4.18)

$\beta_{n2}^d=\beta_{d1}^{d-1}+\alpha+\mu+\omega_n^d$, $2\leq d\leq n-1$ (4.19)

$\omega_n^n=a_n$ (4.20)

$\beta_{n2}^n=\beta_{n1}^n+\alpha+\omega_n^n$ (4.21)

$\omega_i^d\geq 0$, $1\leq i\leq d$ and $1\leq d\leq n$ (4.22)

$a_i\leq \beta_{i2}^d-\beta_{i1}^{d-1}-\alpha\leq a_i+\delta_i$, $d\leq i\leq n$ and $2\leq d\leq n-1$ (4.23)

After reaching $M_{c1}$, the cluster tool operates according to the model in FIG. 3 and CP2 until it reaches $M_{cn}$. Finally, the robot waits at Step n to unload the wafer and transports it to the loadlock, thus, the close-down process ends. During the close-down process, the robot task sequence is known. One only needs to determine the robot waiting time. Objective (4.12) in LPM is to minimize the total robot waiting time. Equations (4.14), (4.16), (4.19) and (4.21) are used to determine when to start unloading the wafer from a step. Equations (4.15), (4.17) and (4.18) are used to determine when to start loading a wafer into a step. Inequality (4.22) demands that the robot waiting time be not less than zero. Inequality (4.23) guarantees that the residency time constraints are satisfied.

For the case of $\cap_{j\in N_n}[\vartheta_{jL},\vartheta_{jU}]=\emptyset$, Theorem 3.2 presents the schedulability conditions to check if the tool is schedulable. Now one investigates that when the system is schedulable for the case of $\cap_{j\in N_n}[\vartheta_{jL},\vartheta_{jU}]\neq\emptyset$, whether a feasible schedule can be found by LPM. To answer it, during the close-down process, the robot waiting time can be set as: 1) $\omega_i^d=\omega_i$, $d\leq i\leq n-1$, $0\leq d\leq n-1$ where $\omega_i$ is obtained by (3.13); 2) $\omega_n^0=\omega_n$; 3)

$$\omega_n^d = \vartheta_{max} - \psi_{c(d-1)} - \sum_{i=d-1}^{n-1}\omega_i^{d-1},$$

$1\leq d\leq n-1$; and 4) $\omega_n^n=a_n$. It is easy to verify that this schedule is in the feasible region of LPM. Therefore, if a system is schedulable according to Theorem 3.2, a feasible and optimal schedule can be obtained by LPM.

Up to now, for the case that the workloads among the steps are properly balanced, i.e., $[\vartheta_{1L},\vartheta_{1U}]\cap[\vartheta_{2L},\vartheta_{2U}]\cap\ldots\cap[\vartheta_{nL},\vartheta_{nU}]\neq\emptyset$, a scheduling algorithm is proposed to find an optimal schedule for the close-down process. For the case that such differences are too large such that $[\vartheta_{1L},\vartheta_{1U}]\cap[\vartheta_{2L},\vartheta_{2U}]\cap\ldots\cap[\vartheta_{nL},\vartheta_{nU}]\neq\emptyset$, a linear programming model is developed to find a feasible optimal schedule for a single-arm cluster tool during the close-down operations. Notice that Algorithm 4.1 consists of several expressions and LPM is a linear programming model. Therefore, it is very efficient to use the present proposed methods to find a feasible and optimal schedule for the close-down process for single-arm cluster tools with wafer residency time constraints.

D. EXAMPLES

Example 1

In a single-arm cluster tool, the wafer flow pattern is (1, 1, 1, 1, 1). The activity time is as follows: ($a_1$, $a_2$, $a_3$, $a_4$, $a_5$; $\alpha_0$, $\alpha$, $\mu$)=(90 s, 100 s, 100 s, 105 s, 115 s; 10 s, 5 s, 2 s). After being processed, a wafer can stay at Steps 1-5 for 20 s ($\delta_i$=20 s, $1\leq i\leq 5$).

Figure 4:
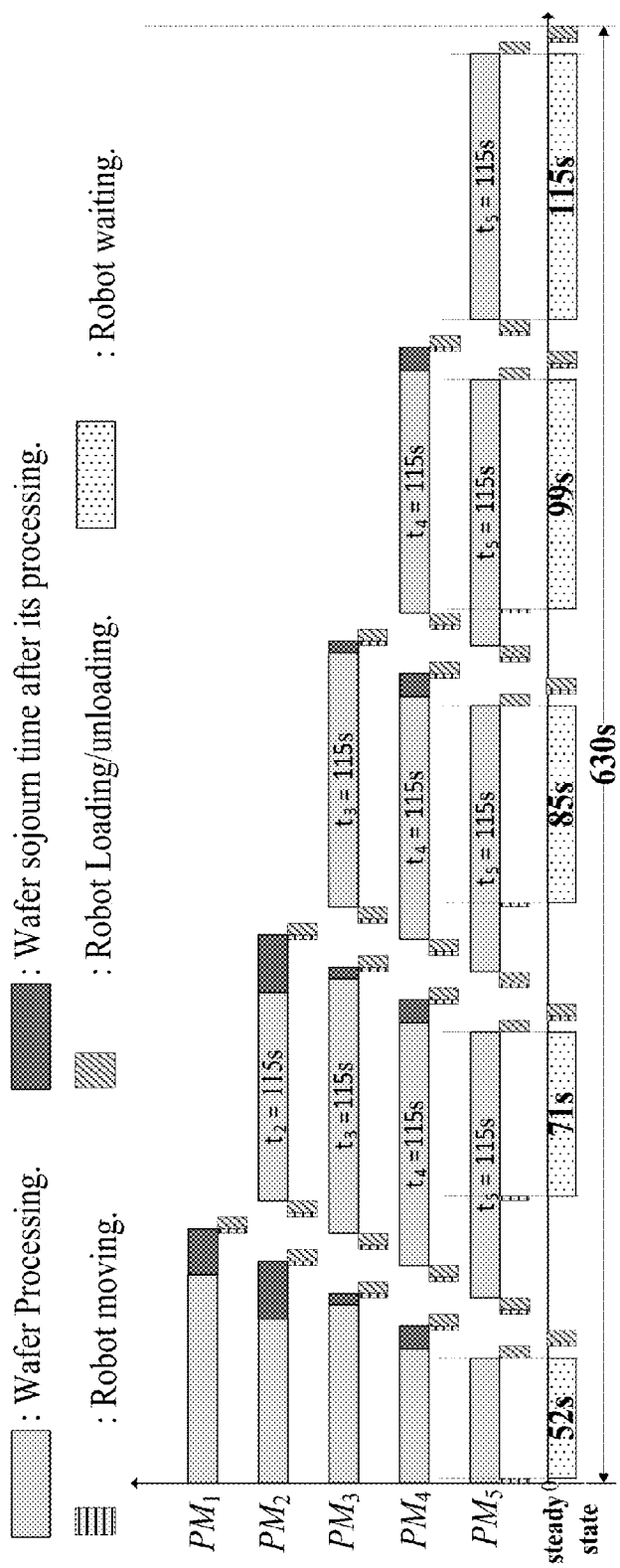
FIG. 4 depicts a Gantt chart for Example 1 according to the present invention.

By (3.5)-(3.8), one has $\vartheta_{1L}$=121 s, $\vartheta_{1U}$=141 s, $\vartheta_{2L}$=126 s, $\vartheta_{2U}$=146 s, $\vartheta_{3L}$=126 s, $\vartheta_{3U}$=146 s, $\vartheta_{4L}$=131 s, $\vartheta_{4U}$=151 s, $\vartheta_{5L}$=141 s, $\vartheta_{5U}$=161 s, and $\psi_1$=89 s. According to Theorem 3.1, the cluster tool is schedulable. For its steady state, an optimal schedule can be obtained by setting $\omega_0=\omega_1=\omega_2=\omega_3=\omega_4$=0 s and $\omega_5$=52 s. Then, its cycle time in the steady state is 141 s. It is easy to verify that the workloads can be balanced among the steps, i.e., $[\vartheta_{1L},\vartheta_{1U}]\cap[\vartheta_{2L},\vartheta_{2U}]\cap\ldots\cap[\vartheta_{nL},\vartheta_{nU}]\neq\emptyset$. By Algorithm 4.1, one can find an optimal feasible schedule for the close-down process. Thus, the robot waiting time is set as follows: 1) During the process from $M_{c1}$ to $M_{c2}$, $\omega_0=\omega_1=\omega_2=\omega_3=\omega_4$=0 s and $\omega_5$=52 s: 2). During the process from $M_{c2}$ to $M_{c3}$, $\omega_2=\omega_3=\omega_4$=0 s and $\omega_5$=71 s; 3) $\omega_3=\omega_4$=0 s and $\omega_5$=85 s; 4) $\omega_4$=0 s and $\omega_5$=99 s; 5) $\omega_5$=115 s. Thus, this robot waiting time determines an optimal feasible schedule for the close-down process. The Gantt chart in FIG. 4 shows the simulation result that takes 623 s to finish the close-down process.

Example 2

The flow pattern is (1, 1, 1, 1). $\alpha$=5 s, $\alpha_0$=10 s, $\mu$=2 s, $a_1$=85 s, $a_2$=120 s, $a_3$=110 s, $a_4$=85 s, and $\delta_i$=20 s, $1\leq i\leq 4$.

Figure 5:
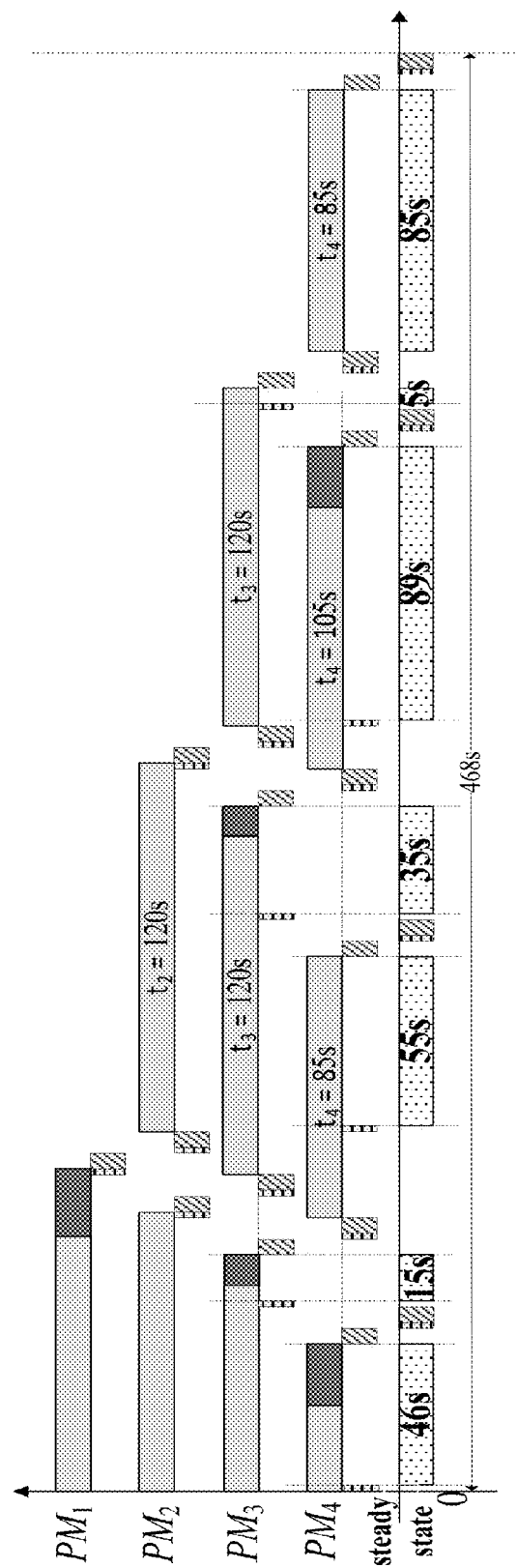
FIG. 5 depicts a Gantt chart for Example 2 according to the present invention.

It follows from (3.5)-(3.8) that, one has $\vartheta_{1L}$=116 s, $\vartheta_{1U}$=136 s, $\vartheta_{2L}$=146 s, $\vartheta_{2U}$=166 s, $\vartheta_{3L}$=136 s, $\vartheta_{3U}$=156 s, $\vartheta_{4L}$=111 s, $\vartheta_{4U}$=131 s, and $\psi_1$=75 s. By Theorem 3.2, the single-arm cluster tool is schedulable. For the steady state, an optimal feasible schedule is obtained by setting $\omega_0$=10 s, $\omega_1=\omega_2$=0 s, $\omega_3$=15 s, and $\omega_4$=46 s. Then, the cycle time of the system under the steady state is 146 s. For this example, $[\vartheta_{1L},\vartheta_{1U}]\cap[\vartheta_{2L},\vartheta_{2U}]\cap\ldots\cap[\vartheta_{nL},\vartheta_{nU}]=\emptyset$ holds since the differences between each step's workload are too large. By the proposed LPM, an optimal feasible schedule is found for the close-down process, during which the robot waiting time is set as follows: 1) From $M_{c1}$ to $M_{c1}$, $\omega_1^1=\omega_2^1$=0, $\omega_3^1$=15, $\omega_4^1$=46 s; 2) From $M_{c2}$ to $M_{c3}$, $\omega_2^2$=0 s, $\omega_3^2$=35 s and $\omega_4^2$ 55 s; 3) From $M_{c3}$ to $M_{c4}$, $\omega_3^3$=5 s and $\omega_4^3$=89 s; 4) From $M_{c4}$ to $M_{ce}$, $\omega_4^4$=85 s. The Gantt chart in FIG. 5 shows the simulation result that takes 468 s to finish the close-down process.

Semiconductor industry has shifted to larger size wafers and smaller lot production. Frequently, the wafer fabrication in the cluster tools switches from one size of wafer lot to another. This leads to many transient switching states, including start-up and close-down process. In some wafer fabrication process, quality products require that a processed wafer should leave the processing module within a given limit time to avoid its excessive exposure to the residual gas and high temperature inside a module. Such time constraints complicate the optimization issue for scheduling a close-down process. The problem and its solution are not seen in the existing research of scheduling cluster tools. This invention develops a Petri net model to analyze the time properties of this close-down process with time constraints. Based on it, the present invention proposes a closed-form algorithm and a linear programming model to regulate the robot waiting time for balanced and unbalanced workload situations, respectively, thereby finding an optimal schedule. The proposed methods are highly efficient.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but is not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A computer-implemented method for determining a schedule of a cluster tool for minimizing a time span of a close-down process based on an objective function and a plurality of wafer sojourn times, the cluster tool comprising a single-arm robot for wafer handling, two loadlocks for wafer cassette loading and unloading, and n process modules each for performing a wafer-processing step with a wafer residency time constraint where the ith process module, $i \in \{1, 2, \ldots, n\}$, is used for performing Step i of the n wafer-processing steps for each wafer, the method comprising:

determining, by a processor, a lower workload $\vartheta_{iL}$ of Step i as follows:

$$\vartheta_{iL} = a_i + 4\alpha + 3\mu, \ i \in N_n \setminus \{1\};$$

$$\vartheta_{1L} = a_1 + 3\alpha + \alpha_0 + 3\mu;$$

determining, by a processor, an upper workload $\vartheta_{iU}$ of Step i as follows:

$$\vartheta_{iU} = a_i + 4\alpha + 3\mu + \delta_i, \ i \in N_n \setminus \{1\};$$

$$\vartheta_{1U} = a_1 + 3\alpha + \alpha_0 + 3\mu + \delta_1;$$

determining, by a processor, that the workloads are balanced among the Steps if $[\vartheta_{1L}, \vartheta_{1U}] \cap [\vartheta_{2L}, \vartheta_{2U}] \cap \ldots \cap [\vartheta_{nL}, \vartheta_{nU}] \neq \emptyset$;

determining, by a processor, a wafer sojourn time at Step 1 ($\tau_1$) during a period from $M_{c1}$ to $M_{c2}$, as follows:

$$\tau_1 = [2(n+1)\mu + (2n+1)\alpha + \alpha_0] + \Sigma_1^n \omega_j^1 - (3\alpha + \alpha_0 + 3\mu);$$

determining, by a processor, a wafer sojourn time at Step d ($\tau_d$) during a period from $M_{cd}$ to $M_{c(d+1)}$, $2 \leq d \leq n-1$, as follows:

$$\tau_d = [2(n-d+2)\mu + 2(n-d+2)\alpha] + \Sigma_d^n \omega_j^d - (4\alpha + 3\mu);$$

determining, by a processor, a wafer sojourn time at Step i ($\tau_i$), $d+1 \leq i \leq n$, during a period from $M_{cd}$ to $M_{c(d+1)}$, $2 \leq d \leq n-1$, as follows:

$$\tau_i = [2(n-d+2)\mu + 2(n-d+2)\alpha]\Sigma_{d-1}^{i-2}\omega_j^{d-1} + \Sigma_i^n \omega_j^d - (4\alpha + 3\mu);$$

determining, by a processor, a wafer sojourn time at Step n ($\tau_n$) during a period from $M_{cn}$ to $M_{ce}$ as follows:

$$\tau_n = \omega_n^n;$$

determining, by a processor, a robot waiting time $\omega_i^d$, $d \leq i \leq n$, $0 \leq d \leq n-1$, by numerically minimizing the objective function of:

$$\Sigma_{d=1}^n \Sigma_{i=d}^n \omega_i^d;$$

subject to a plurality of constraints:
1) a time to start unloading the wafer from a step as determined by:

$$\beta_{n2}^1 = \mu + \omega_n^1;$$

$$\beta_{i2}^d = \beta_{(i+1)2}^d + 2(\alpha+\mu) + \omega_i^d, \ d \leq i \leq n-1 \ \text{and} \ 1 \leq d \leq n-1;$$

$$\beta_{n2}^d = \beta_{d1}^{d-1} + \alpha + \mu + \omega_n^d, \ 2 \leq d \leq n-1;$$

2) a time to start loading the wafer from a step as determined by:

$$\beta_{01}^d = \beta_{n2}^d + \alpha + \mu, \ 1 \leq d \leq n-1;$$

$$\beta_{i1}^d = \beta_{(i-1)2}^d + \alpha + \mu, \ d+1 \leq i \leq n \ \text{and} \ 1 \leq d \leq n-1;$$

$$\beta_{n1}^d = \beta_{01}^d + 2(\alpha+\mu) + \omega_{n-1}^d, \ 1 \leq d \leq n-1; \ \text{and}$$

3) $\omega_n^n = \alpha_n$;

determining, by a processor, the schedule for the close-down process based on the robot waiting time, such that the plurality of wafer sojourn times ($\tau_1$, $\tau_d$, $\tau_i$ and $\tau_n$) as determined satisfy the wafer residency time constraints;

wherein:

$a_i$, $i \in N_n$, is a time that a wafer is processed in the ith process module;

$\beta_{ij}^d$ is a time to start firing $t_{ij}$ (j=1, 2);

$\delta_i$ is the wafer residency time constraint of Step i, given by a pre-determined longest time for which a wafer in the ith process module is allowed to stay therein after this wafer is processed;

$\alpha$ is a time of loading a wafer to or unloading the wafer to the robot in Step i;

$\mu$ is a time of the robot moving from one wafer-processing step to another;

$\alpha_0$ is a time of the robot unloading a wafer from the loadlock and aligning the same;

$M_{cd}$ denotes a $d^{th}$ state during the close-down process of the cluster tool; and $M_{ce}$ denotes a final state during the close-down process of the cluster tool.

2. The method of claim 1, further comprising a step of determining, by a processor, whether the cluster tool is schedulable at steady state.

3. The method of claim 1, further comprising a step of determining, by a processor, the cluster tool to be schedulable at steady state if $\vartheta_{max} \leq \vartheta_{iU}$ and $\psi_1 \leq \vartheta_{iU}$, $i \in N_n$, where $\vartheta_{max} = \max\{\vartheta_{iL}, i \in N_n\}$ and $\psi_1 = 2(n+1)\mu + (2n+1)\alpha + \alpha_0$.

4. The method of claim 1, wherein the robot waiting time is determined based on a petri net model.

5. A computer-implemented method for determining a schedule of a cluster tool for minimizing a time span of a close-down process based on an objective function and a plurality of wafer sojourn times, the cluster tool comprising a single-arm robot for wafer handling, two loadlocks for wafer cassette loading and unloading, and n process modules each for performing a wafer-processing step with a wafer residency time constraint where the ith process module, $i \in \{1, 2, \ldots, n\}$, is used for performing Step i of the n wafer-processing steps for each wafer, the method comprising:

determining, by a processor, a lower workload $\vartheta_{iL}$ of Step i as follows:

$\vartheta_{iL} = a_i + 4\alpha + 3\mu$, $i \in N_n \setminus \{1\}$;

$\vartheta_{1L} = a_1 + 3\alpha + \alpha_0 + 3\mu$;

determining, by a processor, an upper workload $\vartheta_{iU}$ of Step i as follows:

$\vartheta_{iU} = a_i + 4\alpha + 3\mu + \delta_i$, $i \in N_n \setminus \{1\}$;

$\vartheta_{1U} = a_1 + 3\alpha + \alpha_0 + 3\mu + \delta_1$;

determining, by a processor, that the workloads are balanced among the Steps if $[\vartheta_{1L}, \vartheta_{1U}] \cap [\vartheta_{2L}, \vartheta_{2U}] \cap \ldots \cap [\vartheta_{nL}, \vartheta_{nU}] \neq \emptyset$;

determining, by a processor, a wafer sojourn time at Step 1 ($\tau_1$) during a period from $M_{c1}$ to $M_{c2}$, as follows:

$\tau_1 = [2(n+1)\mu + (2n+1)\alpha + \alpha_0] + \Sigma_1^n \omega_j^1 - (3\alpha + \alpha_0 + 3\mu)$;

determining, by a processor, a wafer sojourn time at Step d ($\tau_d$) during a period from $M_{cd}$ to $M_{c(d+1)}$, $2 \leq d \leq n-1$, as follows:

$\tau_d = [2(n-d+2)\mu + 2(n-d+2)\alpha] + \Sigma_d^n \omega_j^d - (4\alpha + 3\mu)$;

determining, by a processor, a wafer sojourn time at Step i ($\tau_i$), $d+1 \leq i \leq n$, during a period from $M_{cd}$ to $M_{c(d+1)}$, $2 \leq d \leq n-1$, as follows:

$\tau_i = [2(n-d+2)\mu + 2(n-d+2)\alpha] \Sigma_{d-1}^{i-2} \omega_j^{d-1} + \Sigma_i^n \omega_j^d - (4\alpha + 3\mu)$;

determining, by a processor, a wafer sojourn time at Step n ($\tau_n$) during a period from $M_{cn}$ to $M_{ce}$ as follows:

$\tau_n = \omega_n^n$;

determining, by a processor, a robot waiting time $\omega_i^d$, $d \leq i \leq n$, $0 \leq d \leq n-1$ by numerically minimizing the objective function of:

$\Sigma_{d=1}^n \Sigma_{i=d}^n \omega_i^d$;

subject to a plurality of constraints:

1) $\omega_i^d = \omega_i$, $d \leq i \leq n-1$, $0 \leq d \leq n-1$ where $\omega_i$ is an $i^{th}$ robot waiting time at steady state, and obtained by:

$$\omega_{i-1} = \begin{cases} 0, & i \in F \\ \vartheta_{max} - (a_1 + \delta_1 + 3\alpha + \alpha_0 + 3\mu), & 1 \in E \\ \vartheta_{max} - (a_i + \delta_i + 4\alpha + 3\mu), & i \in E \cap \{2, 3, 4, \ldots, n\} \end{cases}$$

2) $\omega_n^0 = \omega_n$;

3) $\omega_n^d = \vartheta_{max} - \psi_{c(d-1)} - \sum_{i=d-1}^{n-1} \omega_i^{d-1}$, $1 \leq d \leq n-1$, where $\psi_{c(d-1)} = 2(n-d+2)\mu + 2(n-d+2)\alpha$, $2 \leq d \leq n$;

4) $\omega_n^n = a_n$;

5) a time to start unloading the wafer from a step as determined by:

$\beta_{n2}^1 = \mu + \omega_n^1$;

$\beta_{i2}^d = \beta_{(i+1)2}^d + 2(\alpha + \mu) + \omega_i^d$, $d \leq i \leq n-1$ and $1 \leq d \leq n-1$;

$\beta_{n2}^d = \beta_{d1}^{d-1} + \alpha + \mu + \omega_n^d$, $2 \leq d \leq n-1$;

6) a time to start loading the wafer from a step as determined by:

$\beta_{01}^d = \beta_{n2}^d + \alpha + \mu$, $1 \leq d \leq n-1$;

$\beta_{i1}^d = \beta_{(i-1)2}^d + \alpha + \mu$, $d+1 \leq i \leq n$ and $1 \leq d \leq n-1$;

$\beta_{n1}^d = \beta_{01}^d + 2(\alpha + \mu) + \omega_{n-1}^d$, $1 \leq d \leq n-1$; and determining, by a processor, the schedule for the close-down process based on the robot waiting time, such that the plurality of wafer sojourn times ($\tau_1$, $\tau_d$, $\tau_i$ and $\tau_n$) as determined satisfy the wafer residency time constraints;

wherein:

$a_i$, $i \in N_n$, is a time that a wafer is processed in the ith process module;

$\beta_{ij}^d$ is a time to start firing $t_{ij}$ (j=1, 2);

$\delta_i$ is the wafer residency time constraint of Step i, given by a pre-determined longest time for which a wafer in the ith process module is allowed to stay therein after this wafer is processed;

$\alpha$ is a time of loading a wafer to or unloading the wafer to the robot in Step i;

$\mu$ is a time of the robot moving from one wafer-processing step to another;

$\alpha_0$ is a time of the robot unloading a wafer from the loadlock and aligning the same;

E is $\{i | i \in N_n, \vartheta_{iU} < \vartheta_{max}\}$, where $\vartheta_{max} = \max\{\vartheta_{iL}, i \in N_n\}$;

F is $N_n \setminus E$;

$M_{cd}$ denotes a $d^{th}$ state during the close-down process of the cluster tool; and $M_{ce}$ denotes a final state during the close-down process of the cluster tool.

6. The method of claim 5, further comprising a step of determining, by a processor, whether the cluster tool is schedulable at steady state.

7. The method of claim 5, further comprising a step of determining, by a processor, the cluster tool to be schedulable at steady state if $\vartheta_{iU} < \vartheta_{max}$ with $i \in E \neq \emptyset$, $\vartheta_{iU} \geq \vartheta_{max}$ with $i \in F$, and $\Sigma_{i \in E} \omega_{i-1} + \psi_1 \leq \vartheta_{max}$, and a robot waiting time at steady state is set to make the cluster tool to be schedulable.

8. The method of claim 5, wherein the robot waiting time is determined based on a linear programming model.

* * * * *